Jan. 31, 1950          J. T. FERRY          2,496,124

STATISTICAL CARD COMPARING MACHINE

Filed Dec. 7, 1944          17 Sheets-Sheet 1

INVENTOR
JOHN T. FERRY
BY
ATTORNEY

Jan. 31, 1950

J. T. FERRY 2,496,124

STATISTICAL CARD COMPARING MACHINE

Filed Dec. 7, 1944

| FIG. 6 | |
|---|---|
| | FIG. 5 |
| FIG. 7 | |

INVENTOR
JOHN T. FERRY
BY *JL L Sterling*
ATTORNEY

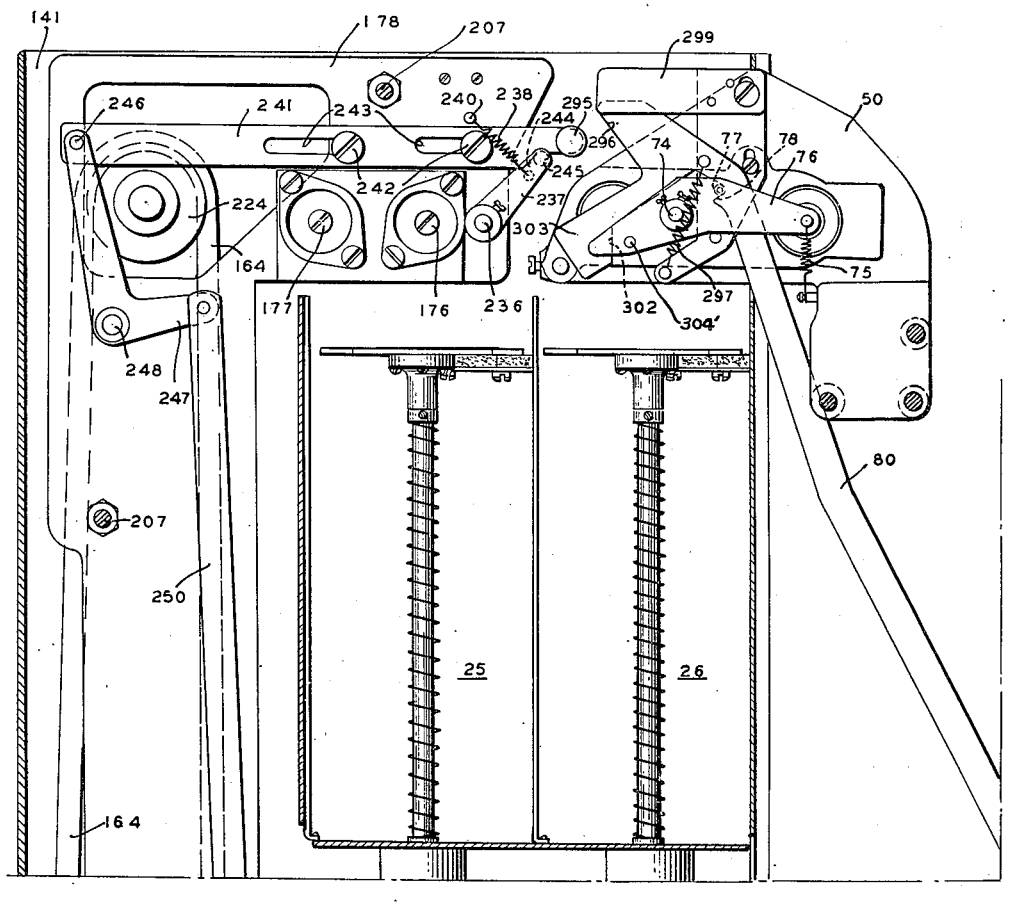

Jan. 31, 1950 J. T. FERRY 2,496,124
STATISTICAL CARD COMPARING MACHINE
Filed Dec. 7, 1944 17 Sheets-Sheet 4

INVENTOR
JOHN T. FERRY
BY
ATTORNEY

Jan. 31, 1950 J. T. FERRY 2,496,124
STATISTICAL CARD COMPARING MACHINE
Filed Dec. 7, 1944 17 Sheets-Sheet 5

INVENTOR
JOHN T. FERRY

BY
ATTORNEY

Jan. 31, 1950  J. T. FERRY  2,496,124
STATISTICAL CARD COMPARING MACHINE
Filed Dec. 7, 1944  17 Sheets-Sheet 6

INVENTOR
JOHN T. FERRY
BY
ATTORNEY

Jan. 31, 1950  J. T. FERRY  2,496,124
STATISTICAL CARD COMPARING MACHINE
Filed Dec. 7, 1944  17 Sheets-Sheet 8

INVENTOR
JOHN T. FERRY
BY *John L Sterling*
ATTORNEY

Jan. 31, 1950  J. T. FERRY  2,496,124
STATISTICAL CARD COMPARING MACHINE
Filed Dec. 7, 1944  17 Sheets-Sheet 9

INVENTOR
JOHN T. FERRY
BY *J. L. Sterling*
ATTORNEY

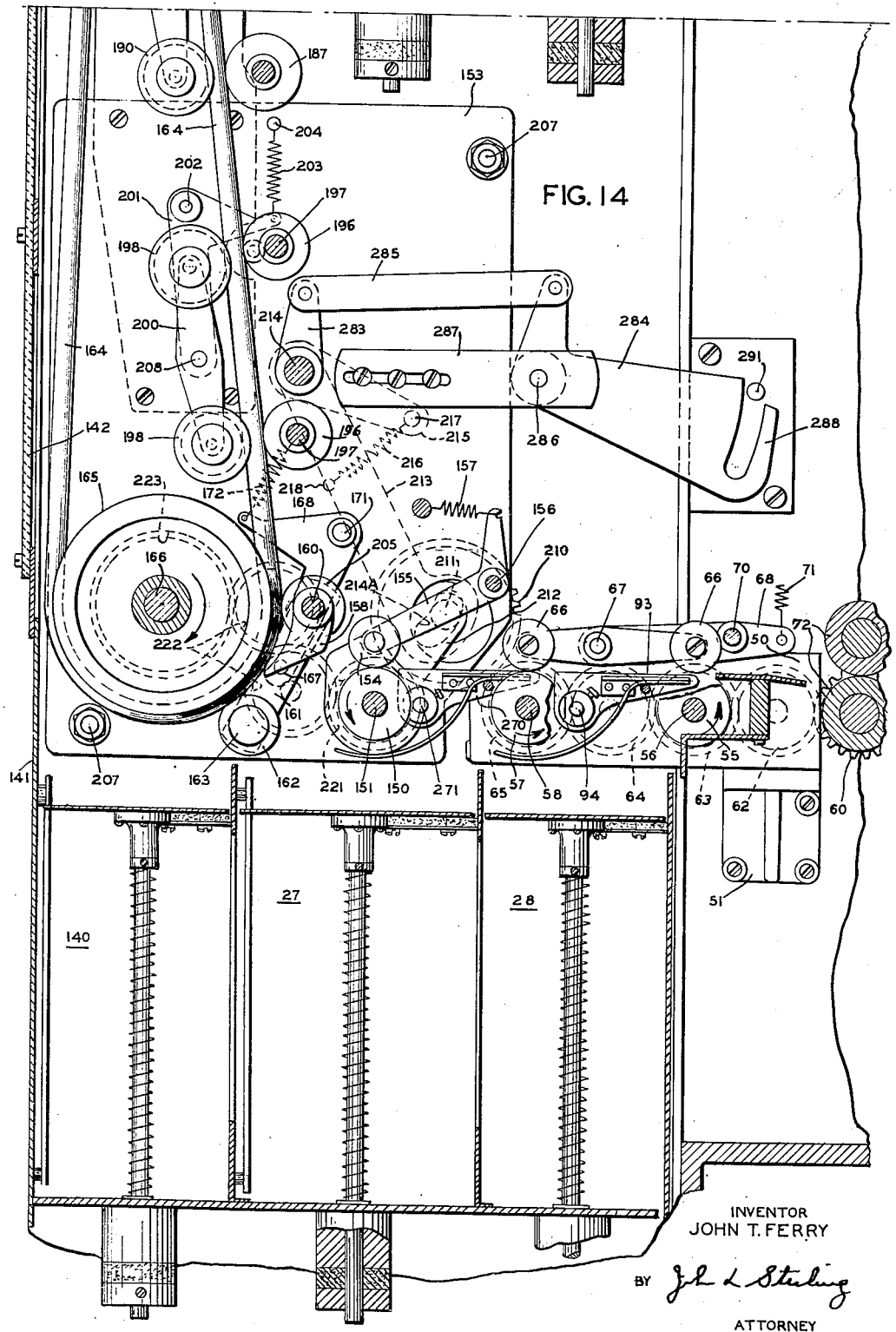

Jan. 31, 1950 J. T. FERRY 2,496,124
STATISTICAL CARD COMPARING MACHINE
Filed Dec. 7, 1944 17 Sheets-Sheet 11
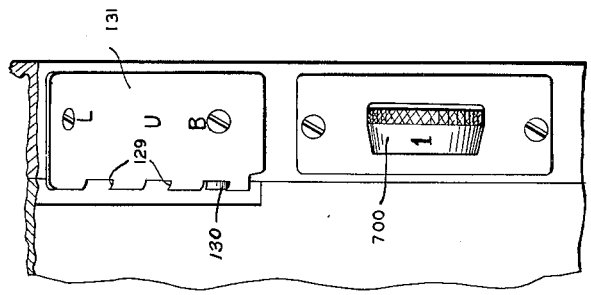
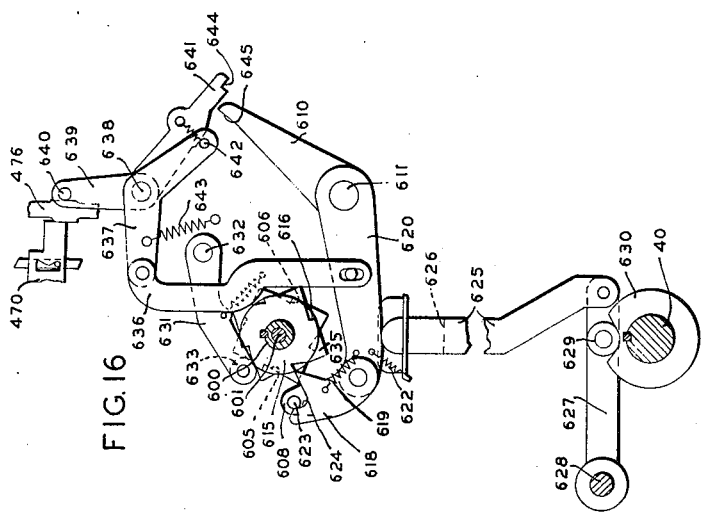
INVENTOR
JOHN T. FERRY
BY *John L. Sterling*
ATTORNEY Jan. 31, 1950 J. T. FERRY 2,496,124
STATISTICAL CARD COMPARING MACHINE
Filed Dec. 7, 1944 17 Sheets-Sheet 12

INVENTOR
JOHN T. FERRY
BY *JR L Sterling*
ATTORNEY

Jan. 31, 1950     J. T. FERRY     2,496,124
STATISTICAL CARD COMPARING MACHINE
Filed Dec. 7, 1944     17 Sheets-Sheet 13

INVENTOR
JOHN T. FERRY
BY *J. L. Sterling*
ATTORNEY

Jan. 31, 1950  J. T. FERRY  2,496,124
STATISTICAL CARD COMPARING MACHINE
Filed Dec. 7, 1944  17 Sheets-Sheet 14

INVENTOR
JOHN T. FERRY
BY John L Sterling
ATTORNEY

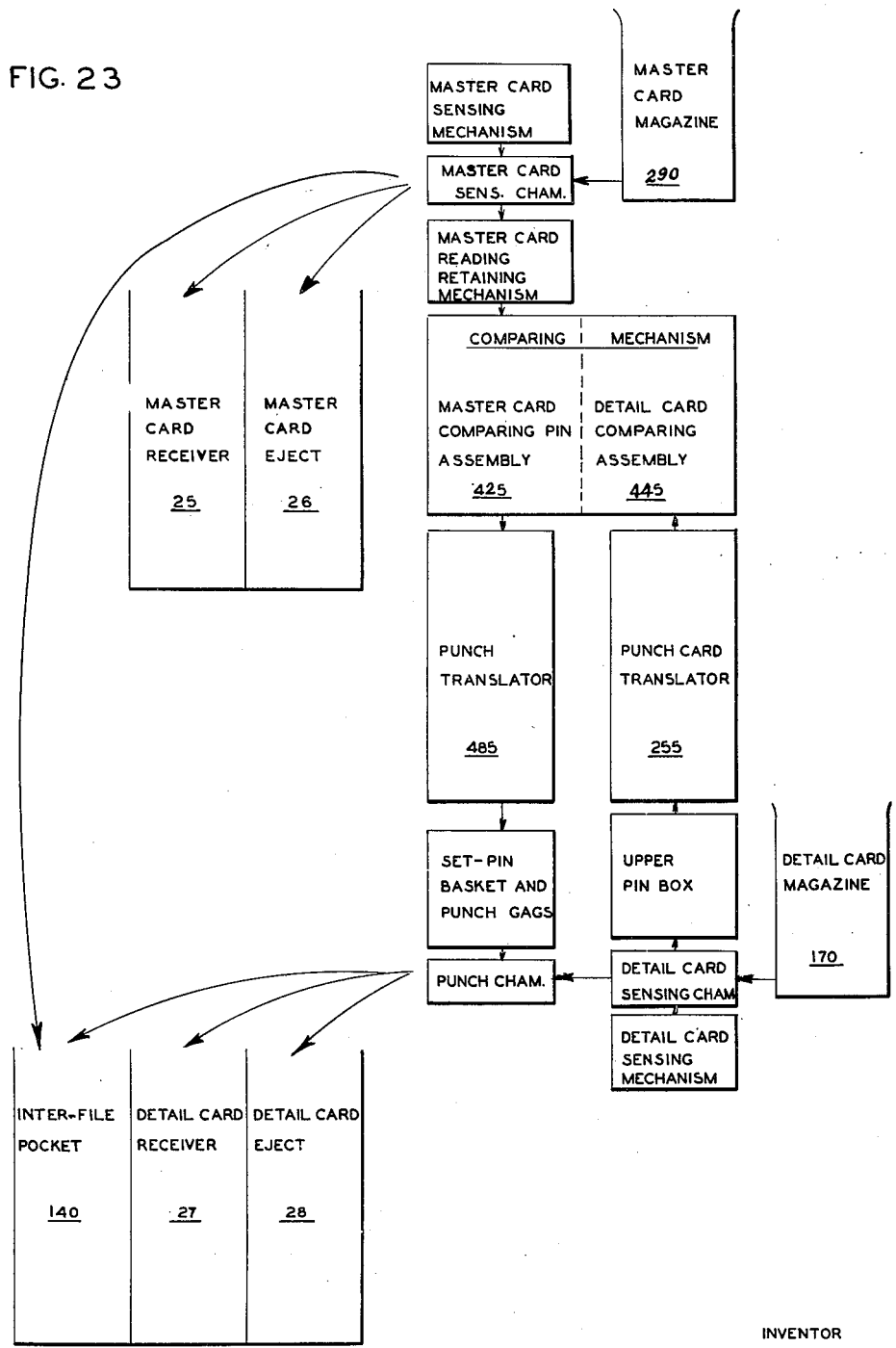

Jan. 31, 1950     J. T. FERRY     2,496,124

STATISTICAL CARD COMPARING MACHINE

Filed Dec. 7, 1944     17 Sheets-Sheet 16

FIG. 24

| | | | 1A | 1B | 1C | 1D | 1E | 1F | 1G | 1H | 1I | 1J | 1K | 2 | 2A | 2B |
|---|---|---|---|---|---|---|---|---|---|---|---|---|---|---|---|---|
| OPERATION ON NON-COMPARISON | | MASTER CARD DEFLECTOR 73 OPEN | | | | × | × | | | | × | | | | | | |
| | | MASTER CARD DEFLECTOR 235 OPEN | × | × | × | | | | | | | | | | × | × | × |
| | | DETAIL CARD DEFLECTOR 93 OPEN | × | | × | × | | × | | | × | | | | | | |
| | | DETAIL CARD DEFLECTOR 270 OPEN | × | × | × | | | | | | | | | | × | × | × |
| | | PUNCH RETRACT MECHANISM HELD EFFECTIVE | | | | | | | | | | | | | | | |
| | | STOPPING MECHANISM OPERATED | | | | | | | | | | | | | | | |
| OPERATION ON COMPARISON | | MASTER CARD DEFLECTOR 73 OPEN | | | | | | | × | × | × | × | × | | | | |
| | | MASTER CARD DEFLECTOR 235 OPEN | × | × | × | | | | | | | | | | × | × | × |
| | | DETAIL CARD DEFLECTOR 93 OPEN | | | | | | | × | × | × | × | | × | | | |
| | | DETAIL CARD DEFLECTOR 273 OPEN | × | × | × | | | | | | | | | | × | × | × |
| | | PUNCH RETRACT MECHANISM HELD EFFECTIVE | | | | | | | | | | | | | | | |
| | | STOPPING MECHANISM OPERATED | | | | | | | | | | | | | | | |
| CONTROL CAMS EFFECTIVE IN ADDITION TO SELECTED CARD FEED CAM | | | 780 | 780 | 780 | 780 | 780 | 780 | 780 | 780 | 780 | 780 | 780 | (780) | (780) | (780) |
| PUNCH TRANSLATOR | | | OUT | OUT | OUT | OUT | OUT | OUT | OUT | OUT | OUT | OUT | OUT | OUT | OUT | OUT |
| SETTING OF SORTING CONTROL LEVER 130 | | | B | U | L | B | U | L | B | U | L | B | U | L | B | U | L |
| SETTING OF SORTING CONTROL KNOB 259 | | | 1 | 1 | 1 | 2 | 2 | 2 | 3 | 3 | 3 | 4 | 4 | 4 | 1 | 1 | 1 |
| TYPE OF OPERATION | | | SORTING | " | " | " | " | " | " | " | " | " | " | " | " | " |
| OPERATION NUMBER | | | 1A | 1B | 1C | 1D | 1E | 1F | 1G | 1H | 1I | 1J | 1K | 2 | 2A | 2B |

INVENTOR
JOHN T. FERRY
BY John L. Sterling
ATTORNEY

Jan. 31, 1950  J. T. FERRY  2,496,124
STATISTICAL CARD COMPARING MACHINE
Filed Dec. 7, 1944  17 Sheets-Sheet 17

FIG.25.

| OPERATION NUMBER | CONTROL CAM EFFECTIVE IN ADDITION TO SELECTED CARD FEED CAM — CAM NUMBER | DISPOSITION OF DETAIL CARDS (SORTING) | | | | | | DISPOSITION OF MASTER CARDS (SORTING) | | | | | |
|---|---|---|---|---|---|---|---|---|---|---|---|---|---|
| | | DETAIL WITH COMPARING MASTERS | | | DETAIL WITH NON-COMPARING MASTERS | | | MASTER WITH COMPARING DETAILS | | | MASTER WITH NON-COMPARING DETAILS | | |
| | | TO "RECEIVER" | TO "EJECT" | TO "INTERFILE" | TO "RECEIVER" | TO "EJECT" | TO "INTERFILE" | TO "RECEIVER" | TO "EJECT" | TO "INTERFILE" | TO "RECEIVER" | TO "EJECT" | TO "INTERFILE" |
| 1 | 780 | x | | | | x | | x | | | | x | |
| 1A | 780 | x | | | x | | | x | | | | x | |
| 1B | 780 | x | | | | x | | x | | | x | | |
| 1C | 780 | | | x | x | | | | | x | | x | |
| 1D | 780 | | | x | | | x | | | x | | x | |
| 1E | 780 | | | x | | x | | | | x | | | x |
| 1F | 780 | | | x | | | x | | | x | | | x |
| 1G | 780 | | | x | | | x | | | x | | | x |
| 1H | 780 | | | x | | | x | | | x | | | x |
| 1I | 780 | | x | | | | x | x | | | | | x |
| 1J | 780 | | x | | | x | | x | | | | | x |
| 1K | 780 | x | | | | | x | x | | | | x | |
| 2 | (780) | | x | | x | | | | x | | x | | |
| 2A | (780) | | x | | | x | | | x | | x | | |
| 2B | (780) | | x | | x | | | | x | | | x | |

INVENTOR
JOHN T. FERRY
BY
ATTORNEY

UNITED STATES PATENT OFFICE 2,496,124

STATISTICAL CARD COMPARING MACHINE

John T. Ferry, Brooklyn, N. Y., assignor to Remington Rand Inc., Buffalo, N. Y., a corporation of Delaware Application December 7, 1944, Serial No. 567,041

16 Claims. (Cl. 209—110)

This invention relates to machines for comparing patterns of perforations, or other designated indications, in different records, and more particularly to record sorting and segregating devices which may be effected as a result of the comparison and/or non-comparison between such patterns.

The invention described herein is shown embodied in a statistical card comparing machine of the type shown and described in patent to Braun 2,211,094, dated August 13, 1940, and patent to McDonnell 2,229,983, dated January 28, 1941. However, while the invention is shown in the above type of machine, it will be understood that the same may be used in connection with any other type of statistical machine without departing from the scope of the invention.

According to the above mentioned Patent 2,211,094, any one or more of three different functions, namely, sorting, punching, or stopping the machine, may be effected or varied as the result of a comparison and/or non-comparison of pre-punched data. For performing the first function, i. e., to segregate or sort the detail and master records having identical designated perforation patterns from the non-comparing detail and master records, the machine is provided with two receiving pockets for detail records and two additional receiving pockets for master records. Interlocking deflector mechanisms, operable by a control mechanism when a comparison or non-comparison is sensed, are provided for each set of receiving pockets whereby comparing detail and master records may be passed to the rear or "receiver" pocket and non-comparing details and/or masters may be passed to the front or "eject" pocket, or vice versa as desired. Throughout the specification, detail and master records that contain identical designative perforation patterns are referred to as "comparing" master and detail records, whereas detail and master records that contain designative data which is not identical are referred to as "non-comparing" master and detail records.

For performing the second function, i. e., to punch additional information in the detail records, the machine is provided with a punch mechanism, settable under control of the master records, whereby any one or more columns of information in a master record may be transferred to a detail record. A punch retract mechanism, operable by the control mechanism, is arranged to cancel or erase the setting in the punch mechanism, whereby punching may be prevented in either comparing detail records or in non-comparing detail records, as desired.

For performing the third function, i. e., to stop the machine (e. g. to permit the insertion of control or supplemental records at various points in a run), means operable by the control mechanism may be arranged to actuate the machine stopping mechanism when either a comparison or a non-comparison is sensed, as desired. Each of the devices for effecting the above mentioned functions may be used individually or in combination with either or both of the other devices.

In addition to the foregoing functions, the above machine is also provided with means for effecting a plurality of different types of record feeding operations, according to the quantitative relationship of the master and detail records to be handled in a particular problem, in conjunction with any desired combination of the above mentioned sorting, punching, and stopping operations. Therefore, the above machine is provided with variably settable operating means for the master and/or detail record feeding mechanisms whereby eight different types of record feeding may be effected, as follows:

1. To feed master and detail records simultaneously on a comparison, and on a non-comparison;

2. To feed detail records only on a comparison and on a non-comparison;

3. To feed master and detail records simultaneously on a comparison, and only master records on a non-comparison;

4. To feed master and detail records simultaneously on a comparison, and only detail records on a non-comparison;

5. To feed only detail records on a comparison, and only master records on a non-comparison;

6. To feed only master records on a comparison, and master and detail records simultaneously on a non-comparison;

7. To feed only detail records on a comparison, and master and detail records simultaneusly on a non-comparison; or 8. To feed only master records on a comparison, and only detail records on a non-comparison.

Thus, any type of accounting problem involving the comparison and/or the non-comparison of master and detail records in which one of the preceding types of record feeding operations is employed, and in which sorting, punching, stopping of the machine, or any combination thereof is to be effected, may be performed by the machine above described.

According to the second mentioned Patent 2,229,983, a sorting control mechanism is provided which may be selectively preset at any one of three different position, i. e., B, U, or L, whereby the deflector mechanisms may be operated in a manner to pass the comparing and/or non-comparing records into "receiver" or "eject" pockets as follows:

B. Comparing detail and master records may be passed to their "receiver" pockets, and non-comparing detail and master records may be passed to their "eject" pockets, or, conversely, comparing detail and master records may be passed to their "eject" pockets and non-comparing detail and master records may be passed to their "receiver" pockets.

U. Comparing and non-comparing detail records and comparing master records may be passed to their "receiver" pockets and non-comparing master records may be passed to their "eject" pocket, or, conversely, comparing and non-comparing detail records and non-comparing master records may be passed to their "receiver" pockets, and comparing master records may be passed to their "eject" pocket.

L. Comparing and non-comparing master records and comparing detail records may be passed to their "receiver" pockets, and non-comparing detail records may be passed to their "eject" pockets, or conversely, comparing and non-comparing master records and non-comparing detail records may be passed to their "receiver" pocket and comparing detail records may be passed to their "eject" pocket.

As there are limitless bookkeeping and accounting problems which necessitate segregating or sorting punch records in various ways, depending upon the problem on hand, the present invention provides means whereby the sorting capacity of statistical machines of the above type may be substantially increased.

Accordingly, the present invention provides a fifth receiving pocket, hereinafter called the "inter-file" pocket, in which comparing and/or non-comparing detail and master records may be passed in alternate arrangement, e. g., master record, detail record, master record, detail record, etc. A second sorting control mechanism is also provided herein which may be selectively preset in any one of four different positions, and which is dependent upon the setting of the above first mentioned sorting control mechanism, set forth in the above Patent 2,229,983, to cause the operation of the deflector mechanisms in a manner to pass comparing and/or non-comparing records to the "receiver," "eject," and/or "inter-file" pockets as follows:

With the first mentioned sorting control mechanism pre-set at its B position and the second mentioned sorting control mechanism pre-set at its Nos. 1, 2, 3 and 4 positions respectively, the following sorting functions may be obtained:

No. 1 position, comparing master and detail records may be passed to their respective "receiver" pockets, and non-comparing master and detail records may be passed to their respective "eject" pockets, or conversely, as desired.

No. 2 position, comparing detail and master records may be passed into the "inter-file" pocket in an alternate arrangement with the master record preceding its associated detail record, and non-comparing master and detail records may be passed to their respective "eject" pockets.

No. 3 position, all comparing and non-comparing master and detail records may be passed to the "inter-file" pocket in an alternate arrangement with the master record preceding its associated detail record.

No. 4 position, non-comparing master and detail records may be passed into the "inter-file" pocket in an alternate arrangement with the master record preceding its associated non-comparing detail record, and comparing master and detail records may be passed to their respective "eject" pockets.

With the first mentioned sorting control mechanism pre-set at its U position and the second sorting control mechanism pre-set at its Nos. 1, 2, 3, and 4 positions, respectively, the following sorting functions may be obtained:

No. 1 position, comparing and non-comparing detail records and comparing master records may be passed to their respective "receiver" pockets, and non-comparing master records may be passed to their "eject" pocket, or, conversely, as desired.

No. 2 position, all comparing master and detail records and non-comparing detail records may be passed to the "inter-file" pocket, in an alternate arrangement with the master record preceding its associated detail record and non-comparing master records may be passed to their "eject" pocket.

No. 3 position, all comparing and non-comparing master and detail records may be passed to the "inter-file" pocket in an alternate arrangement with the master records preceding their associated comparing or non-comparing detail records.

No. 4 position, all comparing master and detail records and non-comparing detail records may be passed to their respective "eject" pockets, and all non-comparing master records may be passed to the "inter-file" pocket.

With the first mentioned sorting control mechanism set at its L position, and the second mentioned sorting control mechanism pre-set at its Nos. 1, 2, 3 and 4 positions, respectively, the following sorting functions may be obtained:

No. 1 position, comparing and non-comparing master records and comparing detail records may be passed to their respective "receiver" pocket, and non-comparing detail records may be passed to their "eject" pocket, or, conversely, as desired.

No. 2 position, all comparing master and detail records and non-comparing master records may be passed to the "inter-file" pocket in an alternate arrangement with the master record preceding its associated detail record, and non-comparing detail records may be passed into their "eject" pocket.

No. 3 position, all comparing and non-comparing detail and master records may be passed to the "inter-file" pocket in an alternate arrangement with the master records preceding their associated comparing or non-comparing detail records.

No. 4 position, all comparing master and detail records and non-comparing master records may be passed to their respective "eject" pockets and non-comparing detail records may be passed to the "inter-file" pocket.

Any of the above segregational and inter-filing functions may be effected selectively and in combination with either or both of the record punching and machine stopping functions of the machine, upon the sensing of a comparison, or non-comparison between designative perforation patterns in master and detail records. Further, an operation selector mechanism is provided whereby a given machine may be preconditioned, in accordance with the several individual types of record handling problems that may arise in a given accounting or statistical system, to effect selectively any one of a plurality of the various available combinational operations of the record sorting, and/or record punching, and/or machine stopping and record feeding. Thus, any type of accounting problem involving the comparison or non-comparison of master and detail records, in which one of the preceding types of record feeding operations is employed, and in which sorting, punching, and stopping of the machine, or any combination thereof, is to be effected, may be performed by the machine comprising the present invention.

The principal object of this invention is to substantially increase the number of different combinational operations that may be performed in a statistical record comparing machine.

Another object of this invention is to selectively segregate and inter-file master and/or detail records upon the sensing of a comparison or non-comparison between designative perforation patterns in master and detail records.

Other objects and structural details of the invention will be apparent from the following description when read in connection with the accompanying drawings, wherein Fig. 1 is an isometric view of a statistical card comparing machine comprising the present invention with cover plates in place;

Figs. 2, 3, and 4 are left hand, right hand, and rear elevations, respectively, of the machine with cover plates in place;

Figs. 5, 6, and 7 considered together, comprise a left side elevation of the invention, partly in section, in conjunction with elements of a statistical card comparing machine that cooperate therewith, showing the relative positions of the several elements when the machine is in normal or stopping position. In Fig. 5 are shown the control device, and the sorting control lever and associated mechanisms; in Fig. 6 are shown the master card deflector operating mechanisms; in Fig. 7 are shown the detail card deflector operating mechanisms, and the sorting control knob and associated mechanisms;

Fig. 8 is a schematic diagram indicating the manner in which Figs. 5, 6, and 7 are combined;

Figs. 9 and 10 considered together comprise a right side elevation of the invention taken just inside the door cover. In Fig. 9 is shown the master card feed roll drive mechanism and in Fig. 10 is shown the detail card feed roll drive mechanism;

Figures 5, 8:
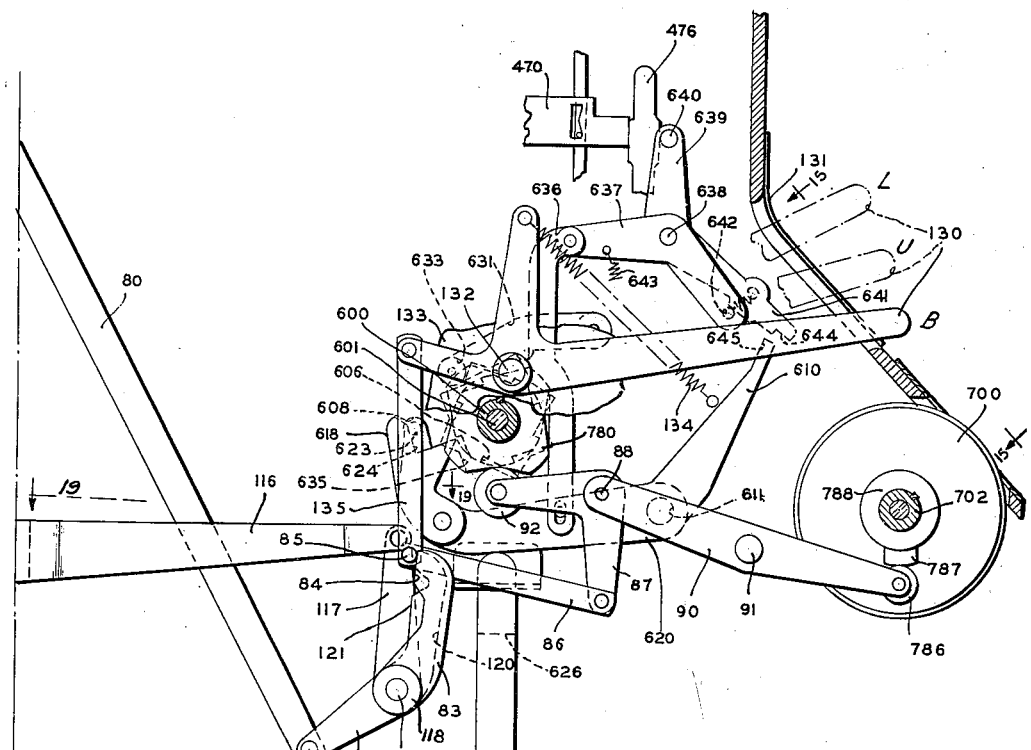
Figure 7:
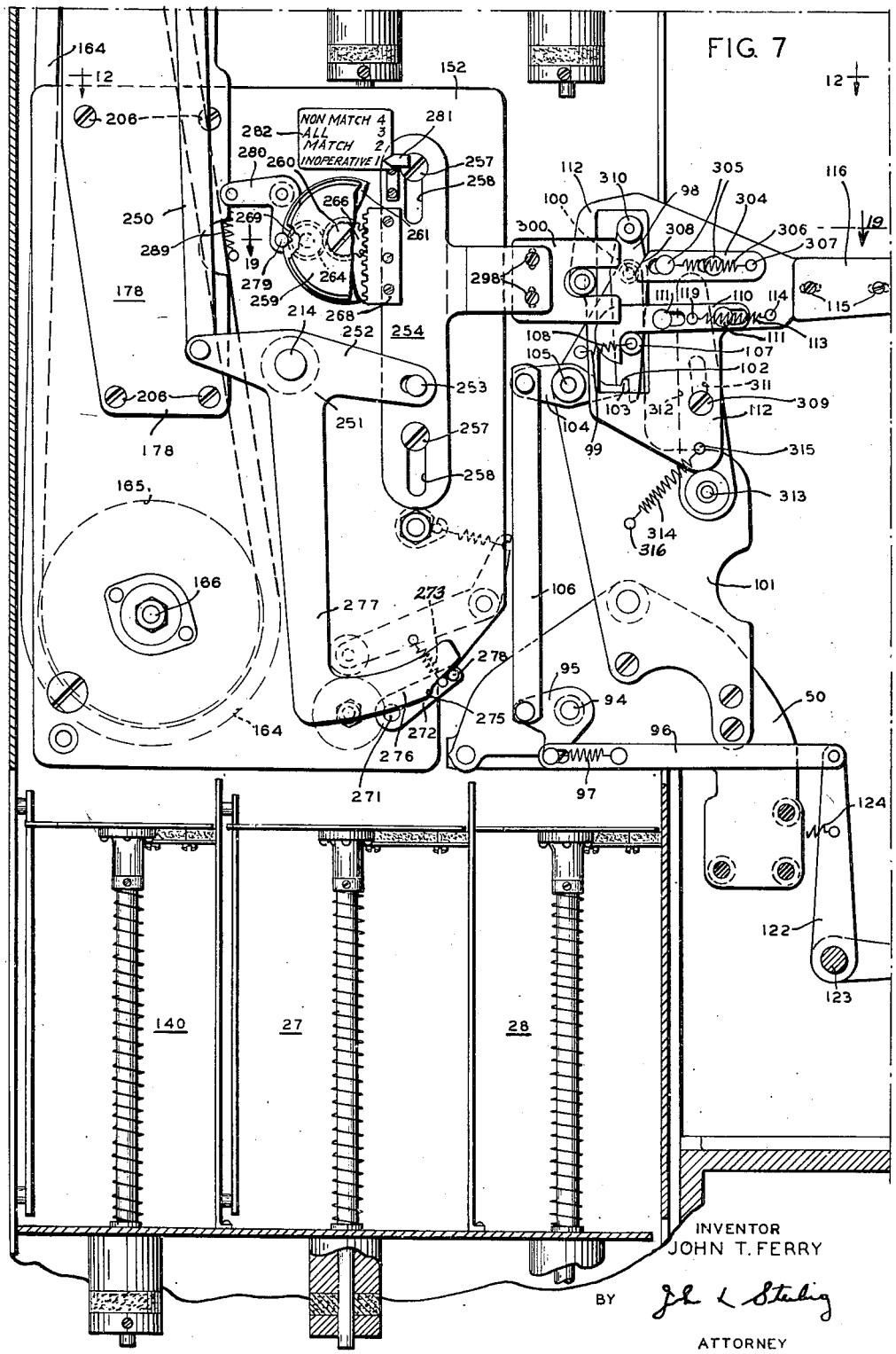
Figure 11:
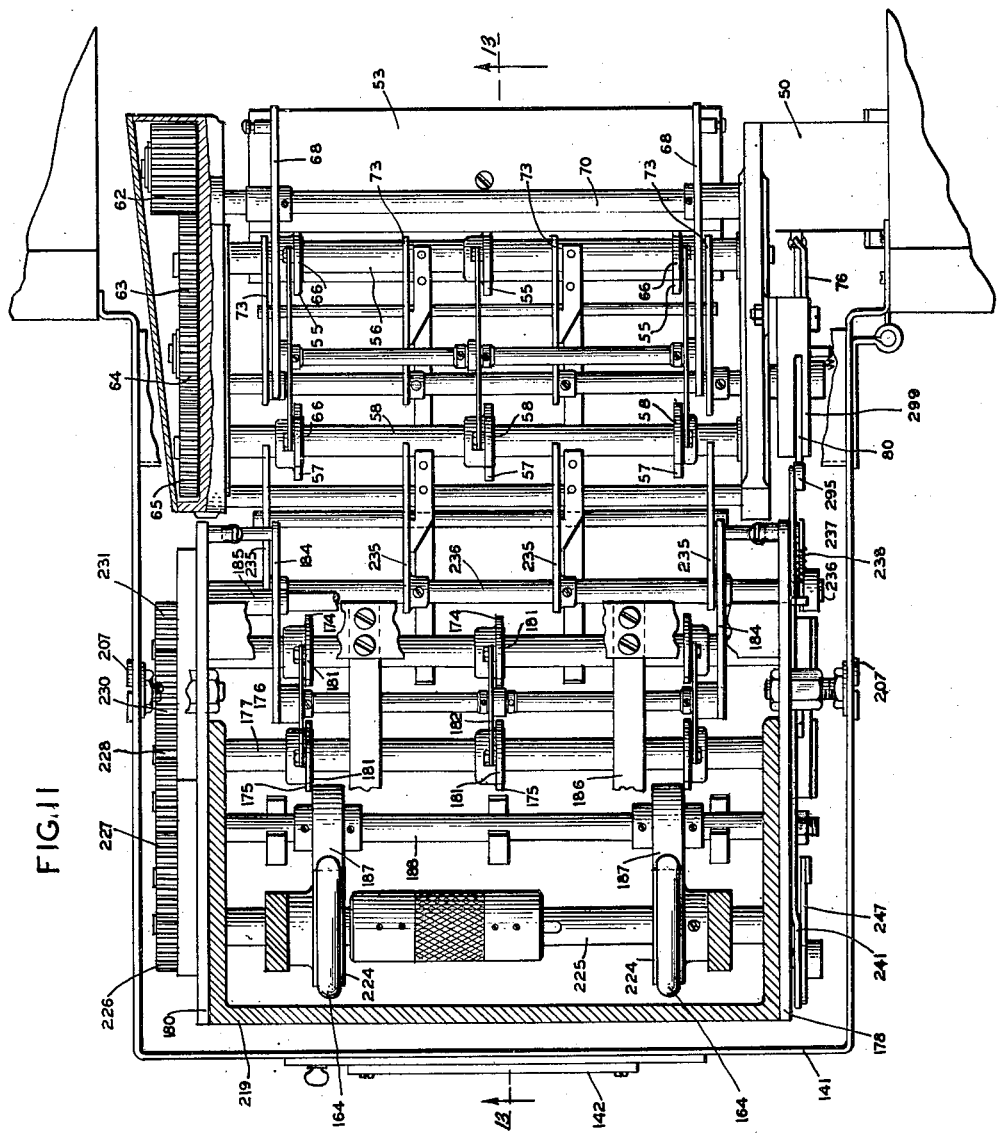
Fig. 11 is a top plan view, partly in section, disclosing the master card deflector, and feed roll drive mechanisms.
Figure 12:
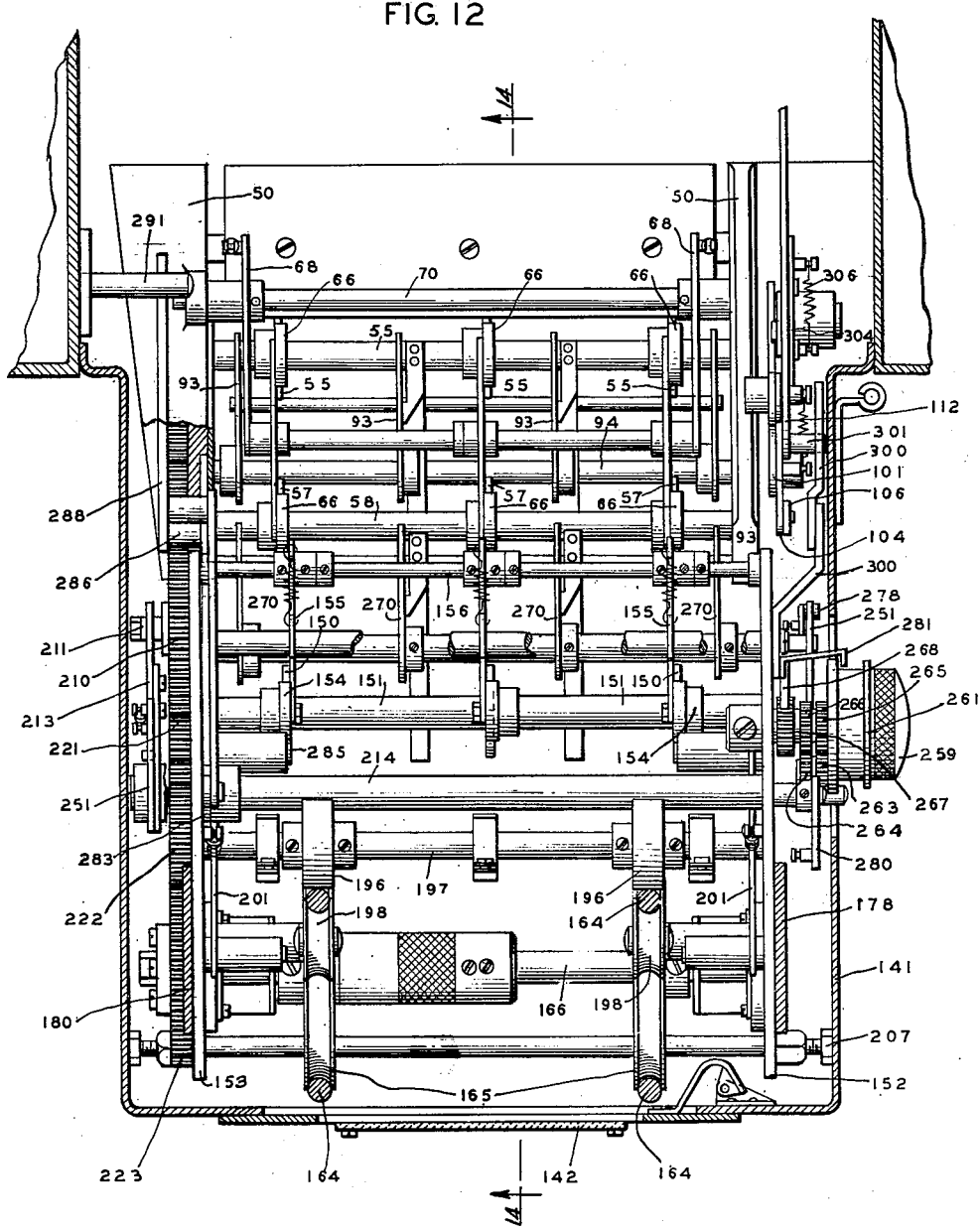
Fig. 12 is a top plan sectional view, taken along the line 12—12 of Fig. 7, disclosing the detail card deflectors, the selection control mechanism, and the detail card feed roll mechanism.
Figure 13:
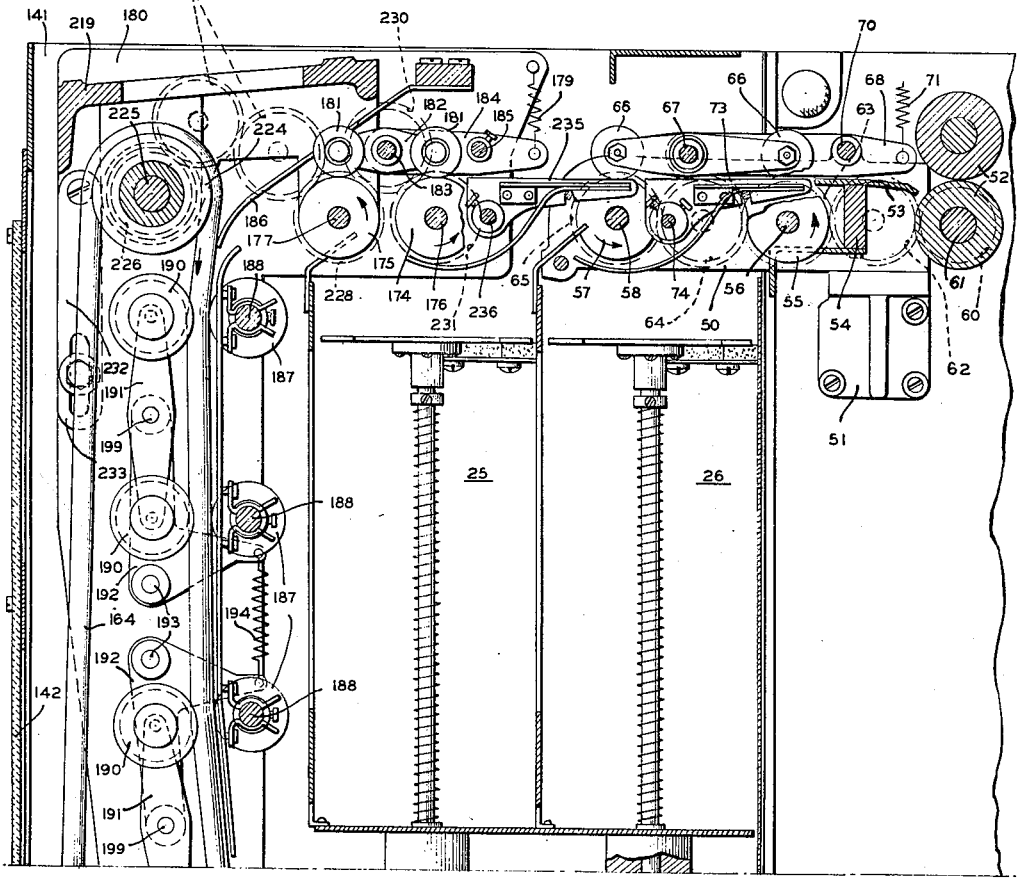
Figure 20:
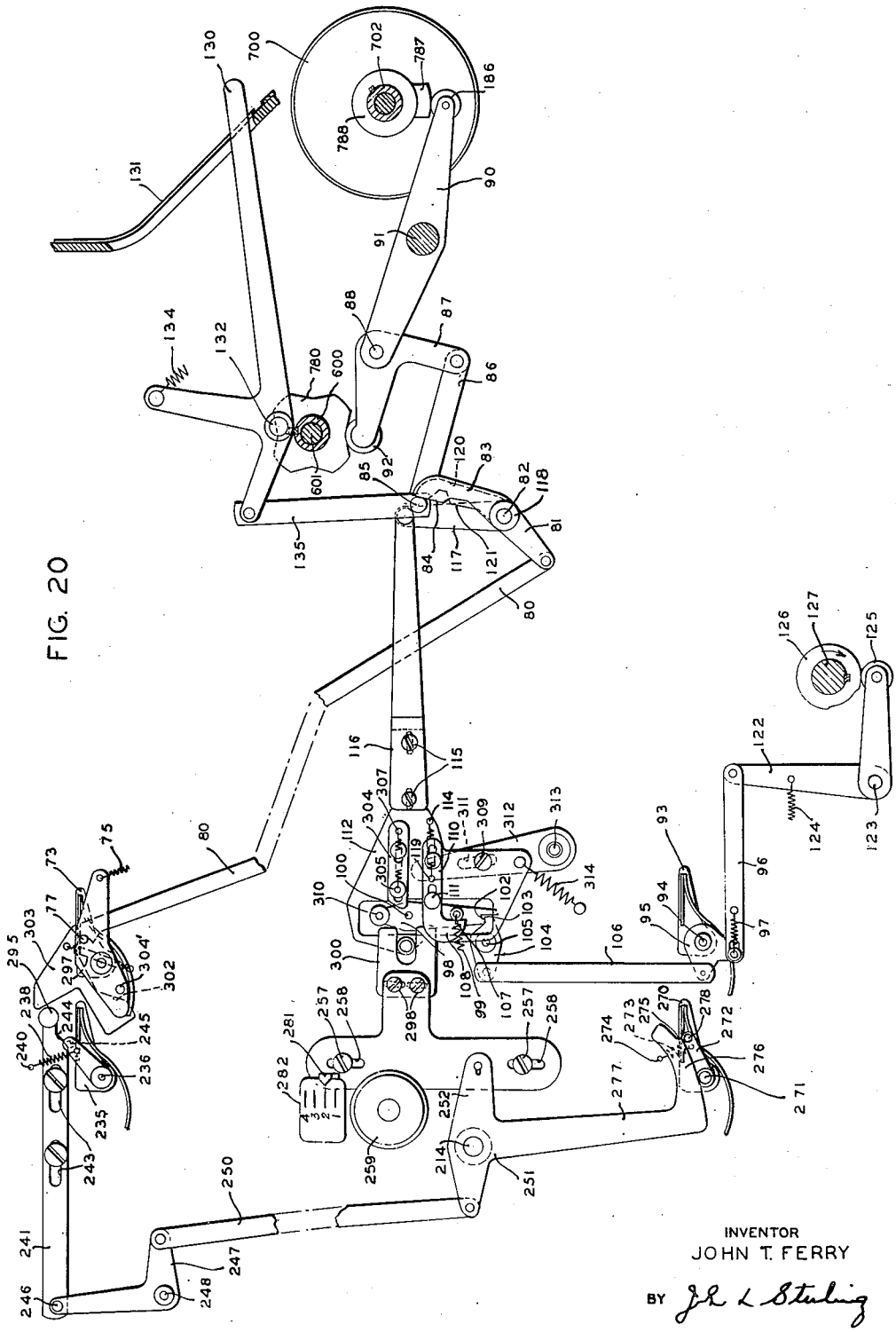
Figure 21:
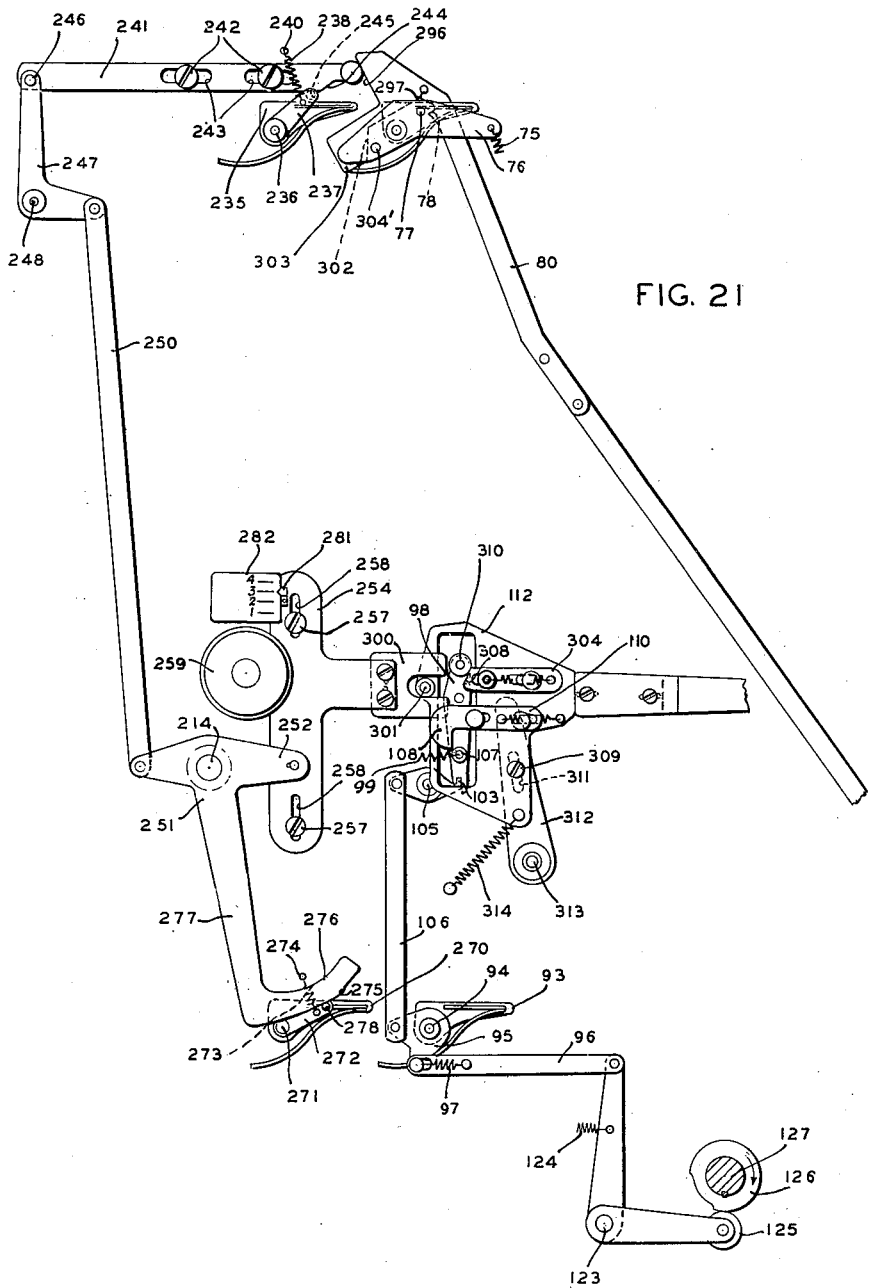
Figure 22:
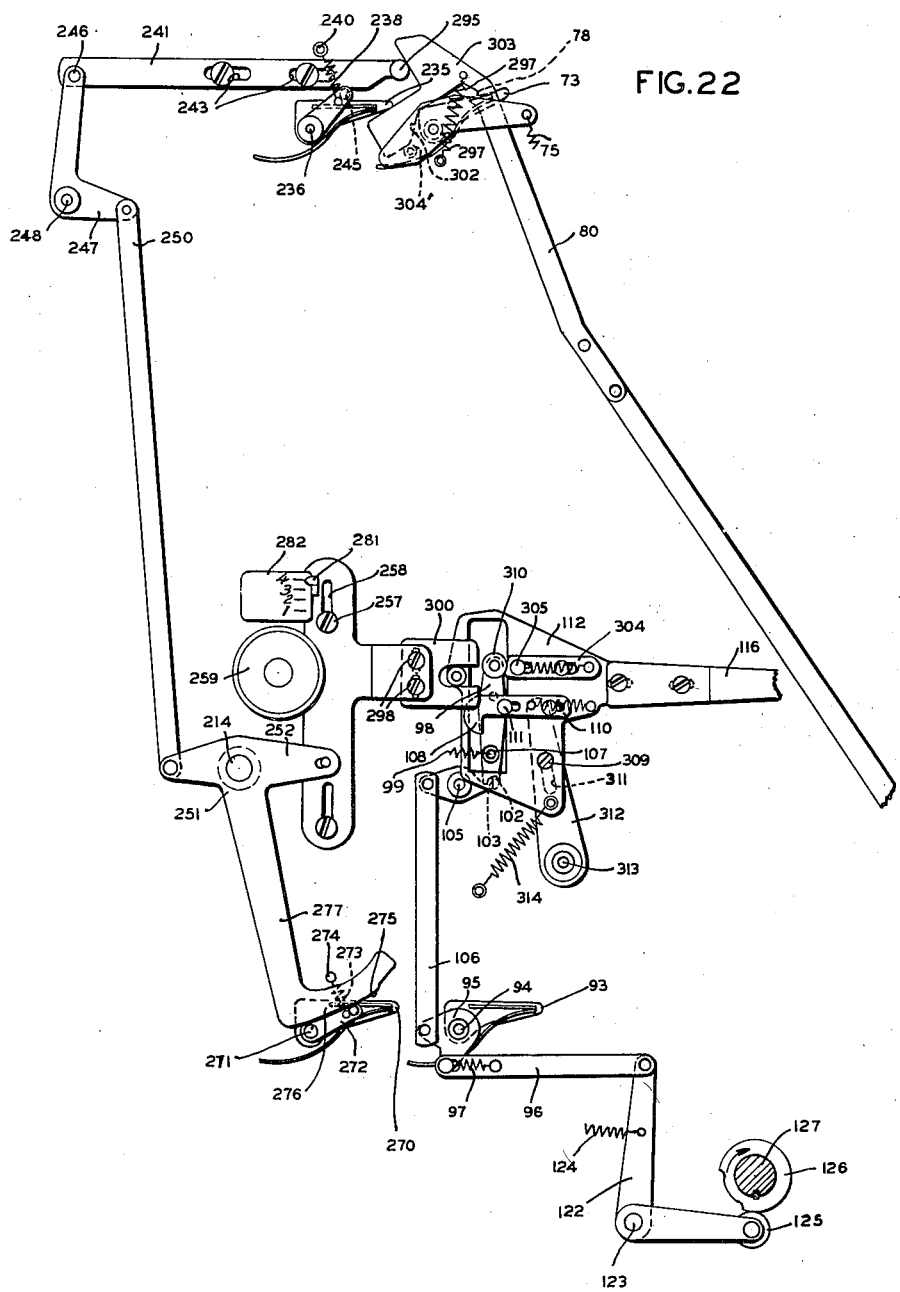

Figs. 13 and 14 considered together comprise a left side cross sectional elevation of the invention, Fig. 13 being taken along the line 13—13 of Fig. 11, and Fig. 14 being taken along the line 14—14 of Fig. 12. In Fig. 13 are shown the master card deflectors and feed rolls, and in Fig. 14 are shown detail card deflectors and feed rolls;

Fig. 15 is a view taken along the line 15—15 of Fig. 5 showing the relative positions of the operation selector dial and the sorting control lever;

Fig. 16 is a detail of the control device actuating mechanism showing the parts in the position attained at the end of a cycle in which a comparison is sensed;

Fig. 17 is an enlarged view of the inner ratchet of the control device actuating mechanism;

Fig. 18 is an enlarged view of the outer ratchet of the control device actuating mechanism;

Fig. 19 is an enlarged detail plan section, taken along the line 19—19 of Figs. 5 and 7, disclosing the selection control knob and its associated mechanism;

Fig. 20 is a left side elevational detail view of the selection control knob and its associated mechanism set at its No. 2 position in conjunction with the deflector mechanisms of the master and detail card receiving pockets, showing the relative positions of the several elements when the machine is in normal or stopping position;

Fig. 21 is a left side elevational detail view similar to Fig. 20, but with the selection control knob and its associated mechanism set at its No. 3 position;

Fig. 22 is a left side elevational detail view similar to Fig. 21, but with the selection control knob and its associated mechanism set at its No. 4 position;

Fig. 23 is a schematic illustration of the principal elements of a statistical card comparing machine of the type disclosed in the above cited patents;

Fig. 24 is a chart indicating various combinational settings of the operation control cam, the sorting control lever, and selection control knob for effecting different types of card handling operations; and Fig. 25 is a chart illustrating the disposition of master and detail cards for each of the operations indicated in Fig. 24 when the card feeding control disc, for causing simultaneous master and detail card feeding on a comparison and non-comparison, is effective.

To facilitate an understanding of the invention, a brief description of a statistical card comparing machine of the type disclosed in the above cited Patent 2,211,094, with which the invention is particularly adapted to function, is included hereinafter. For a detailed description of such machine, reference may be had to the above cited patent.

Statistical card comparing machine—Basic mechanism

In a machine of the type disclosed in the cited patent detail cards are placed in a detail card magazine 170 (see Fig. 23) and are passed seriatim to suitable feed rolls whereby they are conveyed, first, to the detail card sensing chamber in which their perforated data is analyzed, then, in the following cycle, to a punch chamber in which additional data may be perforated in the cards. In the next cycle, the detail cards are conveyed from the punch chamber either to the "receiver" pocket 27 or to an "eject" pocket 28, depending on the setting of the sorting control mechanism and the character of the designative data in the cards. During the period in which a detail card is held in the detail card sensing chamber, the perforation pattern therein is analyzed by sensing pins mounted in a reciprocating pin box of the detail card sensing mechanism whereby a mechanical representation of such perforation pattern is transmitted, by means of pins in an upper pin box and translator wires in a translator 255, to the detail card comparing pin assembly 445 of the comparing mechanism.

Master cards are placed in a master card magazine 290 and are passed seriatim to suitable feed rolls whereby they are conveyed to the master card sensing chamber in which their perforated data is analyzed. In the following cycle, the master cards are conveyed either to the "receiver" pocket 25 or to an "eject" pocket 26, depending on the setting of the sorting control mechanism and the character of the designative data in the cards. During the period in which a master card is held in the master card sensing chamber, the perforation pattern contained therein is analyzed by sensing pins mounted in a reciprocating pin box of the master card sensing mechanism whereby a mechanical representation of such perforation pattern is transmitted to pins in a master card reading retaining mechanism wherein it is retained, by suitable locking mechanism, until a new master card is sensed. The movement of the pins in the reading retaining mechanism is transmitted directly to the master card comparing pin assembly 424 of the comparing mechanism.

Comparing mechanism

In the comparing mechanism the mechanical representations of master and detail card perforation patterns are mechanically compared and the occurrence of a comparison, or non-comparison, between such perforation patterns is utilized to control or vary machine operations. A knowledge of the specific construction of the comparing mechanism is not essential to an understanding of the present invention, but may be obtained from the Patent 2,211,094. Insofar as the present invention is concerned, it is sufficient to understand that the movement of the pins in the master and detail card comparing pin assemblies 425 and 445 (Fig. 23) in accordance with the perforation patterns in master and detail cards, is effective to determine the position of certain comparing slides 470 (partially illustrated in Fig. 16), one of which is provided for each column of a record card. Abutting each slide 470 is a manually settable interponent 476 which, when that column is to be used for comparing purposes, is set in its upper or effective position, as in Fig. 16. The construction and arrangement of the comparing mechanism is such that in the event the compared perforation patterns are identical, the slides 470 are free to move to the left to permit leftward movement of a comparing slide sensing bail rod 640 as in Fig. 16. However, if either pattern contains a perforation for which there is no counterpart in the other, one or more of the slides 470 is blocked and, together with its associated interponent 476, serves to prevent the leftward movement of bail rod 640. The manner in which bail rod 640 is operated to sense the position of comparing slides 470 is described hereinafter under the heading Control device—Actuating mechanism.

Control device

As completely disclosed in the cited Patent 2,211,094, each of the mechanisms for effecting or varying machine functions such as card feeding, sorting, punching, and stopping the machine, as the result of the sensing of a comparison, or non-comparison, in the perforation patterns of master and detail cards, are actuated by individual control cams which may be rendered effected either singly or in combination, as desired, and are arranged for step-by-step operation by common actuating mechanism under control of the comparing mechanism. For convenience, the several control cams and their associated mechanisms, the manually settable means for selectively rendering the control cams effective, and the control cam actuating mechanism, are referred to as the Control device.

Control device—Actuating mechanism

Each of the several control cams employed in a machine of this type is secured to a sleeve 600 (Figs. 5, 16, and 20) rotatably mounted on a stud 601 fixed in the frame of the machine. Each of the control cams is arranged to control its associated mechanism in one manner when the perforation patterns in simultaneously sensed master and detail cards compare, and in a different manner when such perforation patterns do not compare. Therefore, the control cams are arranged to be actuated to effect their respective functions whenever a non-comparison is sensed after a cycle in which a comparison was sensed and, also, whenever a comparison is sensed after a cycle in which a non-comparison was sensed. To effect the requisite movement of the control cams, an actuating mechanism operable under control of the comparing mechanism, is provided to cause recurrent step-by-step movement of sleeve 600. This mechanism comprises an inner ratchet 605 (see Fig. 17) and an outer ratchet 615 (see Fig. 18) each provided with four equally spaced teeth 606 and 616, respectively, and having blank spaces, equivalent to a tooth space, between adjacent teeth. Both ratchets are fast to sleeve 600 (see Fig. 16) but are offset relative to each other so that teeth 616 of ratchet 615 are intermediate to teeth 606 of ratchet 605 whereby, in effect, they form an eight toothed ratchet. Coacting with ratchet 605 is an actuating pawl 608, urged clockwise by a light spring (not shown) carried by the horizontal arm of a lever 610 which is pivoted on a frame stud 611 and is urged counter-clockwise by a spring (not shown). Coacting with ratchet 615 is an actuating pawl 618, urged clockwise by a spring 619, carried by a lever 620 which is also pivoted on stud 611 and is urged counter-clockwise by a spring 622. The arrangement of ratchets 605, 615 and pawls 608, 618 is such that during machine cycles following those in which a comparison was sensed, pawl 608 registers with a blank space on ratchet 605, whereas pawl 618 is in position to register with a tooth 616 on ratchet 615. However, when levers 610 and 620 are in their lowermost positions, a stud 623 on pawl 608 coacts with a cam surface 624 on pawl 618, whereby pawl 618 is moved counter-clockwise against the tension of spring 619 to prevent the engagement of the pawl with a tooth 616.

For operating pawls 608 and 618, an offset push rod 625, provided at its upper end with an abutment 626 arranged to coact with levers 610 and 620, is connected to an arm 627 pivoted at 628 and provided with a follower roller 629 that coacts with a cam 630 keyed to a cam shaft 40 that makes one revolution during each machine cycle. The arrangement of cam 630 is such that levers 610 and 620 are held in their uppermost position by push rod 625 and abutment 626 during the greater part of each cycle but are urged downwardly by their springs at approximately 30° before the end of the cycle, and reach their lowermost positions at the end of the cycle. During the early part of each cycle push rod 625 is elevated and, in the event either pawl 608 or 618 has engaged a tooth 606 or 616, respectively, is effective to actuate sleeve 600 through one-eighth of a revolution. However, in the event pawls 608 or 618 are not engaged with ratchets 605 or 615, respectively, levers 610 and 620 are operated idly and no movement is imparted to sleeve 600. A spring urged detent arm 631, pivoted at 632 and having a roller 633 arranged to coact with a detent plate 635 fast on sleeve 600, is provided to center sleeve 600 in each of its several positions.

In order to effect an actuation of sleeve 600 whenever there is a non-comparison between master and detail card perforation patterns in a cycle following one in which a comparison was sensed, and vice versa, means are provided to sense the position of comparing slides 470 of the comparing mechanism during each cycle and to control actuating pawls 605 and 615 accordingly. For this purpose, an offset vertical link 636 is joined by a pin-in-slot connection to lever 620 and is connected at its upper end to the horizontal arm of a bell-crank 637 pivotally mounted on a transverse rock shaft 638. Secured to shaft 638 are two arms 639 supporting a bail rod 640 which is adapted to sense the position of comparing slides 470 through manually settable interponents 476 which are set in effective position, as shown in the drawings, in the columns containing the designative data. Also fast on rock shaft 638 is an oblique arm 641 which is spring urged into engagement with a limit stud 642 on the pendant arm of bell-crank 637, and is provided with a cutaway shoulder 644 arranged to engage a latch face 645 on an upwardly extending arm of lever 610. The entire assembly comprising shaft 638, bell-crank 637, arms 639 and 641 is urged counter-clockwise by a comparatively strong spring 643 extended between the horizontal arm of the bell-crank and a frame stud.

At the beginning of each cycle cam 630 elevates push rod 625 and, through lever 620, link 636, bell-crank 637, and arm 641, rocks shaft 638 clockwise to move bail rod 640 out of engagement with interponents 476. Toward the end to each cycle, shortly after comparing slides 470 are positioned, follower roller 629 rides into the low dwell of cam 630 thereby lowering lever 620 and link 636, and permitting spring 643 to urge bell-crank 637 and shaft 638 counter-clockwise. In the event all comparing slides 470 in the columns containing designative data are free to move leftwardly, as in the case when the compared perforation patterns in master and detail cards are identical, bail rod 640 is free to move leftwardly whereby shaft 638 rocks counter-clockwise and withdraws shoulder 644 on arm 641 from the path of movement of latch face 645 as lever 610 is rocked counter-clockwise. In this case, when levers 610 and 620 rock their lowermost positions, pawl 608 rides on a blank space of ratchet 605, and stud 623 coacts with cam face 624 to prevent the engagement of pawl 618 with ratchet 615. Thus, when a cycle in which a comparison is sensed follows a cycle in which a comparison was sensed, no movement is imparted to sleeve 600, and the control cams thereon function in the same manner as in the preceding cycle. However, in the event one, or more, of the comparing slides 470 is held in its extreme rightward position when shaft 638 is urged counter-clockwise, as in the case when the perforation patterns in master and detail cards are not identical, bail rod 640 is prevented from moving leftwardly. Shaft 638 is thereby held in rocked position and retains shoulder 644 on arm 641 in the path of movement of latch face 645. In this case, lever 610 is held in its uppermost position as lever 620 descends. Thus, stud 623 is ineffective to prevent the engagement of pawl 618, and spring 619 engages pawl 618 with a tooth 616 on ratchet 615 when lever 620 reaches its lowermost position. Immediately thereafter, push rod 625 is again elevated to actuate lever 620 and pawl 618 which, in turn, actuate sleeve 600. Thus, when a cycle in which a non-comparison is sensed follows a cycle in which a comparison was sensed, sleeve 600 is rotated through one step by lever 620, and the control cams thereon are positioned to control their associated mechanisms accordingly.

In the event another non-comparison is sensed at the end of the succeeding cycle, lever 610 is retained in its uppermost position, as above. In this case, since pawl 618 is now in register with a blank space on ratchet 615, lever 620 moves idly and no further movement is imparted to sleeve 600. This condition is maintained as long as the perforation patterns in simultaneously sensed master and detail card perforation patterns do not compare. However, when the next comparison is sensed, bail rod 640 and shaft 638 are free to rock counter-clockwise and serve to disengage shoulder 644 from latch face 645 to permit lever 610 to follow push rod 625 downwardly. In this case, since pawl 608 is now in register with a tooth 606 on ratchet 605, the subsequent elevation of push rod 625 is effective to actuate sleeve 600. Thus, when a cycle in which a comparison is sensed follows a cycle in which a non-comparison was sensed, sleeve 600 is rotated through one step by lever 610, and the control cams thereon are positioned to control their associated mechanisms accordingly.

*Control device—Card sorting control mechanism*

In punched card systems involving the comparison between perforation patterns of designative data in master and detail cards, it is frequently desirable that the master cards for which there are corresponding detail cards be segregated from the master cards for which there are no corresponding detail cards, or that the detail cards for which there are corresponding master cards be segregated from the detail cards for which there are no corresponding master cards, or, finally, that both master and detail cards be segregated. To effect these functions in the present machine, master card pocket feed rolls are provided to convey master cards from the ejector rolls of the master card sensing mechanism to the master card receiving pockets, and detail card pocket feed rolls are provided to convey detail cards from the ejector rolls of the detail card punch mechanism to the detail card receiving pockets. Furthermore, separate deflector mechanisms, operable in accordance with the action of the comparing mechanism, are provided for each set of card pocket feed rolls whereby comparing detail and master cards may be passed to their respective "receiver" pockets, and non-comparing detail and master cards may be passed to their respective "eject" pockets, or vice versa, as desired.

*Receiving pocket feed roll mechanisms*

Referring to Figs. 6 and 13 the master card receiving pocket feed rolls are arranged in suitable castings 50 supported by brackets 51 secured to the frame of the machine. After leaving the master card sensing mechanism, master cards are passed by ejector rolls 52 over a table plate 53, supported by a cross bar 54, to feed rolls 55 mounted on a transverse shaft 56 journaled in the side castings 50. From feed rolls 55, the cards may be deflected into an "eject" pocket 26, as hereinafter described, or may be fed over a second set of feed rolls 57, mounted on a transverse shaft 58 also journaled in the side castings 50, and may be deflected, as hereinafter described, into a "receiver" pocket 25. For rotating feed rolls 55 and 57, a gear 60 is fixed to lower ejector roll shaft 61 and serves, through an idler 62, to drive a gear 63 fixed on feed roll shaft 56, which, in turn, through a second idler 64, drives a gear 65 on feed roll shaft 58. In order to secure relatively positive feeding of the master cards, skid rolls 66 are mounted on levers pivotally mounted on a cross rod 67, which, in turn, is supported by levers 68 pivoted on a cross rod 70. Skid rolls 66 are urged against their respective feed rolls 55 and 57 by springs 71 extended from the right ends of levers 68.

The detail card feed roll mechanism is arranged, in the same manner, to convey detail cards from ejector rolls 72 of the detail card punch mechanism either to an "eject" pocket 28 or to a "receiver" pocket 27. Therefore, similar reference characters are used to designate corresponding parts.

Master card deflector mechanism

For guiding master cards into "receiver" pocket 25 or "eject" pocket 26, a card deflector 73 (see Fig. 13) is arranged between master card pocket feed rolls 55 and 57 and is fixed on a transverse rock shaft 74 journaled in side castings 50. Card deflector 73 is arranged to occupy either of two positions, namely, a horizontal or closed position in which it serves to guide master cards from feed rolls 55 to rolls 57, or an inclined or open position in which it serves to deflect master cards passed from rolls 55 into "eject" pocket 26. Deflector 73 is normally urged to its horizontal position by a spring 75 (see also Fig. 6) extended between a frame stud and the forwardly extending arm of a bell crank 76, fixed on shaft 74, whereby, in the absence of further control, all master cards are guided to "receiver" pocket 25.

In order to control the position of deflector 73 in accordance with the action of the comparing mechanism, the forward arm of bell crank 76 is provided with a stud 77 which positively engages a notch or shoulder 78 formed on a downwardly extending link 80, which link is connected at its lower end (see also Fig. 5) to an arm 81 fast on a rock shaft 82 journaled in a suitable bracket on the frame of the machine. Fixed to the end of shaft 82 is a vertical arm 83 having a working face 84 that lies in the path of movement of a pin 85 (see also Fig. 20) fixed in the end of a horizontal link 86. The link 86 is connected to the pendant arm of a bell crank 87 pivoted at 88 to a lever 90 pivotally mounted on frame stud 91. The horizontal arm of bell crank 87 carries a roller 92 adapted to co-act with a card sorting cam 780 that is keyed to sleeve 600 of the control device. The arrangement of this linkage is such that, when cam 780 is to be rendered effective, the control card sorting lever 90 is rocked clockwise, as hereinafter described, to elevate pivot 88 and move roller 92 into operative relationship with cam 780. Thus, when a non-comparison is sensed, sleeve 600 is actuated by cam 630, as described above, to place the adjacent high dwell of cam 780 in register with roller 92. Bell crank 87 is thereby rocked counter-clockwise and through link 86, pin 85, and arm 83 rocks shaft 82 clockwise, whereby link 80 is elevated to rock deflector 73, through the pin 77 and shoulder 78 connection, to its inclined position. As described in the above cited Patent 2,211,094, the actuation of sleeve 600 which serves to rock deflector 73 is effected in the early part of the cycle following that in which the non-comparison is sensed. Thus, deflector 73 is held open during the greater part of the following cycle, and serves to deflect the non-comparing master card, which is passed from the master card sensing chamber during the mid portion of the cycle, into "eject" pocket 26. In the event the succeeding master card also contains a non-comparing perforation pattern, no further movement is imparted to sleeve 600 and the succeeding non-comparing master card is also passed to "eject" pocket 26, however, if the succeeding master card contains a comparing perforation pattern, the sleeve 600 is again actuated, as described above, to place a low dwell of cam 780 in register with roller 92, whereby deflector 73 is restored to its horizontal position by spring 75, at the beginning of the succeeding cycle, to guide the comparing master card past the "eject" pocket 26.

Detail card deflector mechanism

In order to segregate detail cards in a similar manner, a detail card deflector 93 (see Figs. 14 and 20) is arranged between detail card pocket feed rolls 55 and 57, and is fixed to a transverse rock shaft 94 journaled in the side castings 50. Fixed to the end of rock shaft 94 is a bell crank 95 (see also Fig. 7) having a pin in its pendant arm that extends into a slot in a horizontal link 96. Bell crank 95 is urged counter-clockwise, to urge deflector 93 to its inclined position, by a spring 97, extended between the pin on the bell crank and a pin on the link 96, but is retained in the position shown in Fig. 7 by a latch plate 98, pivoted at 100 on an upright frame plate 101 secured to the side casting 50. The latch plate 98 is urged clockwise by a relatively light spring 99 and is provided at its lower end with a notched shoulder 102, arranged to engage a hook 103 on the forward arm of a bell crank 104 which is pivoted at 105 to the frame plate 101. The rear arm of bell crank 104 is connected by a link 106, to the horizontal arm of bell crank 95. In order to control the position of deflector 93 in accordance with the action of the comparing mechanism, latch plate 98 is provided with a roller 107, adapted to be engaged by hook portion 108 of a pawl 110 mounted for sliding movement on studs 111 fixed on a settable link 112. A spring 113 heavier than spring 99, extended between a stud 114 on the link 112 and a stud 119 on pawl 110, serves to urge the hook portion 108 of pawl 110 against the roller 107, and rock the latch plate 98 counter-clockwise about its pivot 100. The settable link 112 is adjustably secured at 115 to a forwardly extending link 116 (see also Figs. 5 and 19), which link is connected at its forward end to an arm 117 fixed on a sleeve 118 rotatably mounted on rock shaft 82. Also fixed to sleeve 118 is a vertical arm 120 having a working face 121 that lies in the path of movement of pin 85. With this arrangement, when a non-comparison is sensed cam 780 rocks bell crank 87 counter-clockwise, and by means of elements 86, 85, 120, 118, and 117, serves to move through link 116, the settable link 112. Movement of the settable link 112 will cause the pawl 110, carried thereby, to also move forwardly by the tension of spring 113. Thus pawl 110 tends to rock latch plate 98 counter-clockwise to release bell cranks 104 and 95, and to permit the opening of deflector 93 by spring 97.

However, as heretofore mentioned, all detail cards are passed through the punch mechanism after leaving the detail card sensing mechanism, and require an additional cycle to reach their respective receiving pockets. Therefore, means are provided to prevent the opening of deflector 93 until immediately prior to the time that the non-comparing card is released from the punch chamber. For this purpose, a positive engagement is established between the hook portion 103 on bell-crank 104, and the notched shoulder 102 on latch plate 98, whereby it serves to retain the bell-crank 95 and the deflector 93 in a closed position when the adjustable lever 112 is moved forwardly. This forward movement of the settable link 112 merely serves to tension spring 113. In order to release deflector 93 at the proper time, the right end of link 96 is connected to an offset bell-crank 122 pivotally mounted on a transverse shaft 123. Bell-crank 122 is urged counter-clockwise by a strong spring 124 whereby its follower roller 125 is urged against a cam 126 on a cam shaft 127, which, as described in the above Patent 2,211,094, makes one revolution during each machine cycle. Near the end of the cycle following that in which the non-comparison is sensed, roller 125 rides into the low dwell of cam 126 and permits spring 124 to rock bell-crank 122 counter-clockwise to move link 96 leftwardly. This movement serves to rock bell-crank 95 slightly clockwise which, through link 105, rocks bell-crank 104 slightly clockwise to disengage the hook portion 103 thereof from the notched shoulder 102 on latch plate 98. Immediately, spring 113 becomes effective to rock the latch plate 98 counter-clockwise out of latching position. Just before the end of the cycle, cam 126 rocks bell-crank 122 clockwise to return link 96 to its forward position, whereby spring 97 is effective to rock bell-crank 95 and shaft 94 counter-clockwise to open deflector 93. Thus, at the end of the cycle following that in which the non-comparison is sensed, deflector 93 is opened. During the next cycle, i. e., during the second cycle following the sensing of the non-comparison, the detail card is passed from the punch chamber and is deflected into "eject" pocket 28. Near the end of this cycle, roller 125 again rides in the shallow dwell of cam 126. In this case, since spring 97 has pulled the pin in the bell-crank 95 to the right end of slot in link 96, spring 124 is effective to close deflector 93, and to rock bell crank 104 to a position to engage latch plate 98. In the event another non-comparison is sensed, no movement is imparted to cam 780, and latch plate 98 is held in rocked position by spring 113, settable lever 112, etc. In this case, cam 126 is effective near the end of the cycle to re-open deflector 93, whereby the succeeding non-comparing detail card is also deflected into "eject" pocket 28. However, if a comparison is sensed, cam 780 is actuated one step, whereby the latch plate 98 is returned by spring 99 to its latching position to engage bell-crank 104. Deflector 93 is thereby retained in closed position to guide the comparing detail card past "eject" pocket 28.

*Selective control of deflector mechanisms*

Figure 1:
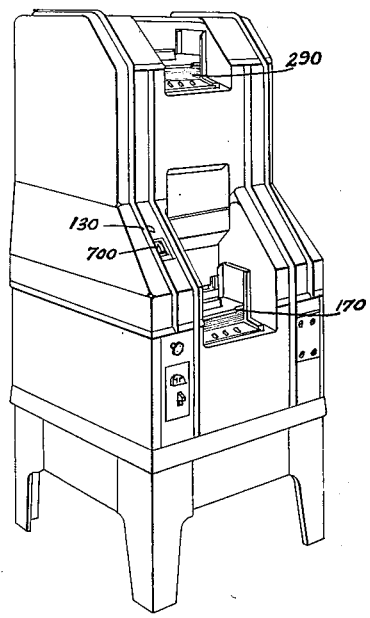

As is fully set forth in the above mentioned Patent 2,229,983, in order to control selectively the sorting of master cards, or detail cards, or master and detail cards concomitantly, in the "receiver" or "eject" pockets, the machine provides means manually settable to either of a plurality of positions, to cause the operation either of the deflector mechanism of the master card receiving pockets, or of the deflector mechanism of the detail card receiving pockets, or of the deflector mechanisms of master and detail card receiving pockets concomitantly, in accordance with the sensing of comparisons or non-comparisons between perforation patterns of designative data contained in master and detail cards. For this purpose a three arm sorting control lever 130 (Figs. 1, 15 and 20) is provided the forward arm of which extends through a slot in the frame of the machine, to be received in either of three notches 129 formed in an indicator plate 131 secured to the frame of the machine. The lever 130 is pivotally mounted on a stud 132 secured to the left hand support plate 133 of the control mechanism, and is urged in a clockwise direction by means of a spring 134 extended between a stud on the upright arm of lever 130 and a stud on the support plate 133. Connected to the rearwardly extending arm of 130 is a pendant link 135 which is connected at its lower end to link 86 by pin 85. By this arrangement lever 130 may be set in either an L position, a U position, or a B position, as denoted on indicator plate 131 (see Fig. 15), whereby pin 85 is correspondingly positioned relative to the working faces 84 and 121 on arms 83 and 120 respectively, of the master and detail card deflector mechanisms. Accordingly, when the lever 130 is set in its L position, the pin 85 is at its full lower position so that it is in horizontal alignment only with the working face 121 on arm 120. When lever 130 is set in its U position the pin 85 is at its intermediate position so that it is in horizontal alignment only with cam face 84 on arm 83. When the lever 130 is set in its B position, the pin 85 is at its full upper position so that it is in horizontal alignment with camming faces 121 and 84 on the arms 120 and 83, respectively. By this means, when lever 130 is set in its L position only the detail card deflector 93 is controlled in accordance with the action of the comparing mechanism, whereby the comparing detail cards are conveyed past detail card deflector 93, and the non-comparing detail cards are deflected to detail card "eject" pocket 28. When lever 130 is set in its U position only the master card deflector 73 is controlled in accordance with the action of the comparing mechanism, whereby the comparing master cards are conveyed past the master card deflector 73, and the non-comparing master cards are deflected to master card "eject" pocket 26. When lever 130 is set in its B position, both deflectors 73 and 93 are controlled by the comparing mechanism, whereby comparing and non-comparing master cards, as well as comparing and non-comparing detail cards, are conveyed to or past their respective "eject" pockets.

Thus, when cam 780 is rendered effective to control card sorting, lever 130 may be set in accordance with the requirements of a given card handling problem to cause the sorting of master cards only, or of detail cards only, or of master cards and detail cards concomitantly.

From the foregoing, it will be seen that the deflector mechanisms of the master and detail card receiving pockets may be controlled in a manner whereby a statistical record comparing machine may be preconditioned to 1. Segregate comparing detail records from non-comparing detail records and to convey all master records to one receiving pocket;
2. Segregate comparing master records from non-comparing master records and to convey all detail records to one receiving pocket; or
3. Segregate comparing detail records from non-comparing detail records, as well as to segregate comparing master records, from non-comparing master records.

*Inter-file mechanism*

In many punched card systems involving the comparison between designative perforation patterns in master and detail records it is desirable, in addition to segregating comparing and non-comparing master and detail records in the manner above described, that certain of the comparing and/or non-comparing master and detail records be inter-filed in one common pocket upon comparing or non-comparing operations of the machine.

Figure 4:
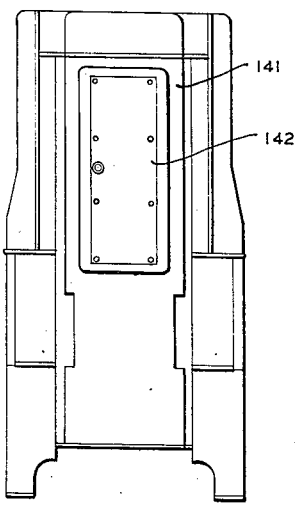

In order to effect inter-filing functions, the present invention provides an "interfile" pocket 140 located to the rear of and arranged in horizontal alignment with the detail card "receiver" and "eject" pockets 27 and 28, respectively. The upper receiving pockets 25 and 26, the lower receiving pockets 27, 28, and 140, and their associated mechanisms, are mounted within a door 141, hinged in the usual manner, to the left hand frame casting of the machine and is provided with a door 142 (Fig. 4) mounted upon its rear wall to provide free access to the pockets and the various mechanisms within the door 141.

*Interfile pocket feed roll mechanism*

Referring to Figs. 12 and 14, the detail cards, after leaving the feed rolls 57 and the skid rolls 66, may be deflected into the detail "receiver" pocket 27, as hereinafter described, or may be fed over another set of feed rolls 150 mounted on a transverse shaft 151 which shaft is journaled at its ends in left and right hand upright frame plates 152 and 153 respectively. In order to secure relative positive feeding of the detail cards each of the feed rolls 150 has cooperating therewith a skid roll 154 mounted for rotation upon an arm 155 pivoted upon a cross shaft 156, which cross shaft is fixed at its ends in frame plates 152 and 153. Skid rolls 154 are urged against their respective feed rolls 150 by springs 157 extended from arms 155. The rolls 150 and 154 feed the card until the leading edge thereof may be deflected downwardly by a plurality of deflector arms 158 suitably secured to a cross shaft 160 fixed at its ends in arms 161. Thus, the detail cards may be deflected into the path of a pair of feed rolls 162 rotatably mounted upon stub shafts 163 each of which is secured at one end to its associated arm 161. Each of the feed rolls 162 cooperates with a belt 164 of a rotatable pulley wheel 165 secured to a cross shaft 166 journaled at its ends in frame plates 152 and 153. Arms 161 are pivotally mounted at 167 to one arm of respective bell-cranks 168 which are rotatably mounted on stub shafts 171 secured at one end to their respective frame plates 152 and 153. In order to secure relatively positive feeding of the detail cards between the belt 164 and rolls 162, the rolls 162 are resiliently urged against the belt by means of individual springs 172 each having one end connected to its respective bell-crank 168, and the other end connected to a cross shaft 197 journaled at its ends in frame plates 152 and 153. From the rolls 162 and belt 164 the detail cards are passed to the "interfile" pocket 140.

Referring to Figs. 11 and 13, after passing the feed rolls 57 and skid rolls 66, the master cards may be deflected into the master card "receiver" pocket 25, as hereinafter described, or may be fed to two sets of feed rolls 174 and 175 secured to shafts 176 and 177 respectively, which shafts are journaled at their ends in left and right hand frame plates 178 and 180. Cooperating with each set of feed rolls 174 and 175 are skid rolls 181, mounted for rotation on arms 182 pivotally mounted upon a cross shaft 183, which cross shaft is supported at either end by levers 184. The levers 184 are pivotally mounted upon a cross shaft 185, journaled at its ends in left and right hand frame plates 178 and 180. In order to secure relatively positive feeding of the master cards, skid rolls 181 are urged against their respective feed rolls 174 and 175 by springs 179 extended between the levers 184 and pins on respective frame plates 178 and 180. From the feed rolls 175 and skid rolls 181 the cards may be deflected by deflector fingers 186 to a plurality of feed rolls 187 mounted for rotation upon cross shafts 188 journaled at their ends in frame plates 178 and 180. Feed rolls 187 cooperate with the belt 164 in a manner to feed cards between the belt and the rolls. Cooperating with belt 164 and rolls 187, in a manner to insure positive feeding of the master card, is a plurality of sets of skid rolls 190 each set of which is mounted upon respective levers 191 which in turn are pivotally mounted at 199 upon one arm of respective bell-cranks 192. The bell-cranks 192 are mounted upon individual stub shafts 193 secured to their respective frame plates 178 and 180. Springs 194 serve to urge skid rolls 190 against the belt 164 to urge the belt 164 against rolls 187. From feed rolls 187, the card is fed to a lower set of feed rolls 196 (see Figs. 12 and 14) mounted upon cross shafts 197 which are journaled at their ends in frame plates 152 and 153. Cooperating with the feed rolls 196 and belt 164 is a set of skid rolls 198 mounted upon levers 200, which are pivotally mounted at 208 upon one arm of a bell crank 201 rotatably mounted upon stub shafts 202 which, in turn, are secured at one end to their respective frame plates 152 and 153. Springs 203, having one end connected to the bell cranks 201 and the other end connected to the pins 204 on frame plates 152 and 153, serve to urge the skid rolls 198 against the belt 164 to urge the belt 164 against rolls 196. From feed rolls 196 and skid rolls 198, the card is fed to feed rolls 205 rotatably mounted upon shaft 160, and, from thence, deflected by deflector 158 to feed rolls 162 which, with the cooperation of belt 164, serve to feed the master card into the "inter-file" pocket 140.

Figure 2:
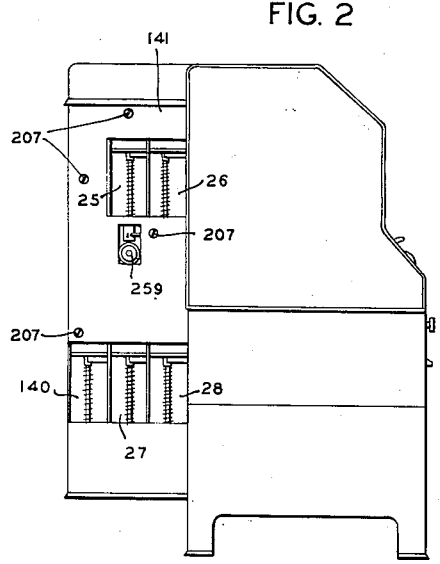
Figure 3:
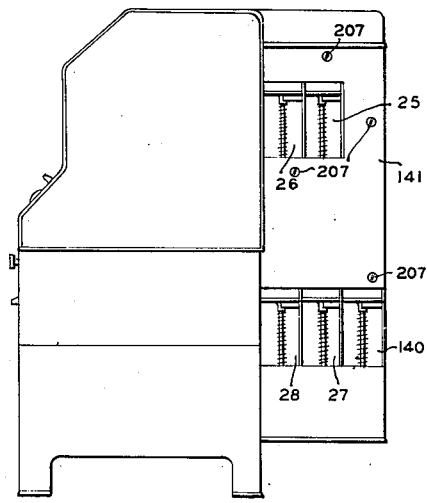
Figure 10:
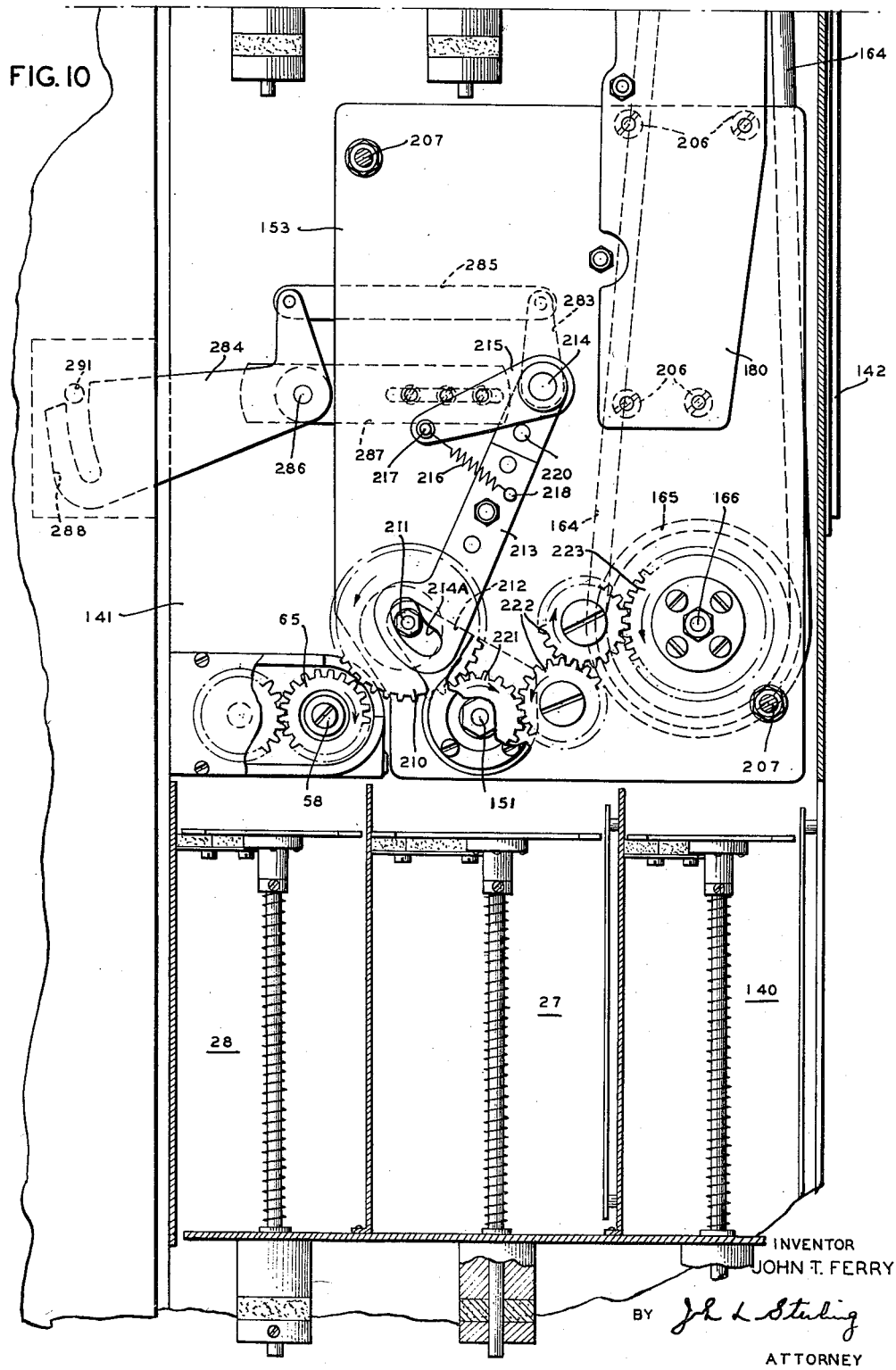

It will be noted that the frame plates 178 and 180 are secured by screws 206 (Figs. 7 and 10) to respective frame plates 152 and 153. In order to properly align the master and detail card feed rolls above described so that the cards may be properly fed into the "inter-file" pocket 140, the assembly, including plates 152, 153, 178, and 180, upon which the above mechanism is mounted, is adjustably mounted upon the side walls of the door 141 by means of screws 207 (see also Figs. 2, 3, and 11).

Figure 9:
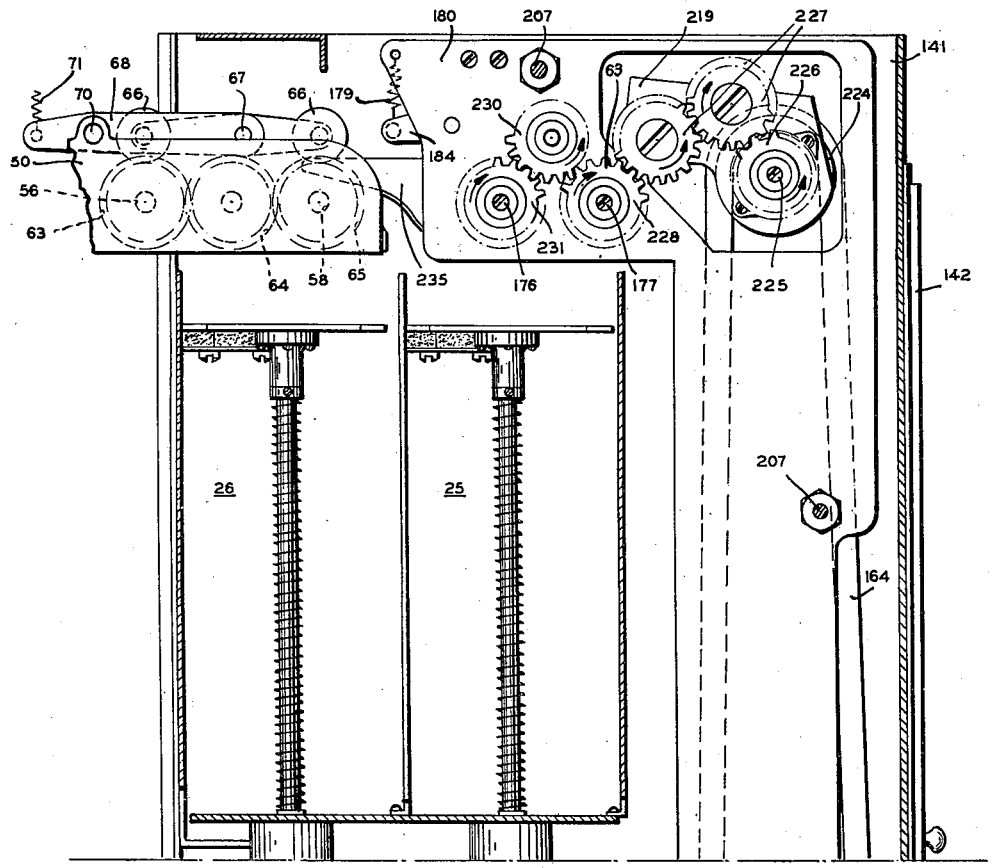

For rotating the various feed roll shafts and the pulley shaft 166 above described, a gear 210 (see Figs. 10, 12, and 14) is provided which may be selectively brought into and out of mesh, as hereinafter described, with gear 65 described above in connection with the detail card ejector rolls 57. Gear 210 is rotatably mounted upon a stub shaft 211 journaled at its ends in a pair of rockable arms 212 pivoted upon suitable bearings on feed roll shaft 151. Gear 210 may be brought into and out of mesh with gear 65 by means of a depending arm 213, pivoted upon a cross shaft 214 which is journaled at its ends in frame plates 152 and 153. The lower end of the depending arm 213 is provided with an eccentric cam slot 214a which straddles one end of the stub shaft 211 in a manner that, when the arm 213 is rocked clockwise (Fig. 10), the gear 210 is brought into mesh with the gear 65. The arm 213 is rocked by means of a rearwardly extending arm 215 secured to shaft 214. The arm 215 is resiliently connected to the arm 213 by a spring 216, having one end connected to a pin 217 on arm 215 and the other end connected to a pin 218 on the arm 213. A pin 220 on arm 213 cooperates with arm 215 in a manner to limit counter-clockwise movement of the arm 213. The above construction is such that when shaft 214 and arm 215 are rotated in a clockwise direction, as hereinafter described, the arm 213 through spring 216 is moved clockwise so as to bring gear 210 into mesh with the gear 65. It will be seen that once the gear 210 is in mesh with the gear 65, further movement of the arm 215 will merely tension spring 216. When the shaft 214 and arm 215 are rocked counter-clockwise, arm 215 will engage the pin 220 to rock the arm 213 counter-clockwise thereby disengaging the gears 210 and 65. Gear 210 is constantly in mesh with another gear 221 secured to the right hand end of feed roll shaft 151. Pulley shaft 166 is rotated by means of a pair of idler gears 222, one of which is in mesh with gear 221 and the other in mesh with a gear 223 secured to the right hand end of pulley shaft 166. The above construction is such that, when the gear 210 is moved into mesh with gear 65, clockwise rotation of the gear 65 (Fig. 10) will cause clockwise rotation of gear 221 which, through idlers 222, rotate the gear 223 and pulley shaft 166 in a counter-clockwise direction. In order to drive the master card feed rolls 174, 175, each belt 164 associated with the shaft 166 is connected at its upper end to an associated pulley 224 secured to a cross shaft 225 journaled at its ends in an adjustable frame casting 219. In order to secure a proper tensioning of belts 164, the frame casting 219 is rockably mounted at its forward end upon feed roll shaft 177, and has pivoted at its rearward end a pair of depending links 232 adapted to be adjustably secured at their lower ends to their respective frame plates 178 and 180 by screws 233. Secured to the extreme right hand end of shaft 225 (see Figs. 9 and 11) is a gear 226 which, through a pair of intermeshed idler gears 227 mounted upon the frame casting 219, drive a gear 228 secured to the right hand end of feed roll shaft 177. The gear 228 drives an idler gear 230, mounted upon frame plate 180, which gear 230 in turn drives a gear 231 secured to the right hand end of feed roll shaft 176. The above construction is such that when shaft 166 rotates counter-clockwise (Fig. 10) pulley shaft 225 also rotates counter-clockwise which, through associated idlers, rotates shafts 177 and 176 clockwise. It will be noted at this point that the above drive mechanism is so arranged and constructed that in all cases the master cards are passed into the "inter-file" pocket before its corresponding comparing or non-comparing detail card.

*Master and detail card deflector mechanism*

For guiding master cards into "receiver" pocket 25, when it is desired not to feed master cards into the "inter-file" pocket as above described, a card deflector 235 (Figs. 11 and 13) is arranged between master card pocket feed rolls 57 and 174 and is fixed on a transverse rock shaft 236 journaled in the frame plates 178 and 180. The card deflector 235 is arranged to occupy either of two positions, namely, a horizontal or closed position, as shown in Fig. 20, in which it serves to guide cards from rolls 57 and 66 from whence they are passed through rolls 174 and 182, etc., to "inter-file" pocket 140, or an inclined or open position in which it serves to deflect cards passed from rolls 57 and 66 into "receiver" pocket 25. Referring to Figs. 6 and 11, the left hand end of deflector shaft 236 extends beyond the frame plate 178 and has secured thereto an arm 237. Arm 237 is resiliently urged in a counter-clockwise direction by means of a spring 238 having one end connected thereto and the other end connected to a pin 240 mounted upon frame plate 178. Thus, deflector 235 is normally urged to its open position by spring 238, whereby master cards passed by rolls 57 and 66 may be deflected into "receiver" pocket 25.

The master card deflector 235 may be lowered to closed position whereby the master card may be fed into the "inter-file" pocket 140, as above described, by means of a slide bar 241 (Fig. 6) mounted for front to rear sliding movement, upon a pair of studs 242 which pass through associated slots 243 on bar 241 and are secured to the frame plate 178. Toward its forward end thereof, the slide bar 241 is provided with an inclined cam portion 244 adapted when said bar is moved forwardly, to engage a pin 245 on arm 237 and rock said pin and arm in a clockwise direction to close deflector 235. The rear end of slide bar 241 is connected at 246 to the upright arm of a bell-crank 247 pivoted upon a stud 248 secured to the frame plate 178. The forward arm of bell crank 247 is connected by a link 250 to the rearwardly extending arm of a three arm bell-crank 251 (see also Fig. 7) secured to the left hand end of cross shaft 214. Bell-crank 251 is provided with a forwardly extending arm 252, the forward end of which is connected by pin and slot connection 253 to a rack bar 254, mounted for vertical sliding movement upon screws 257 which pass through associated slots 258 on rack bar 254 and are secured to frame plate 152.

For guiding detail cards into receiver pocket 27, when it is desired not to feed detail cards into the "inter-file" pocket 140 as above described, a card deflector 270 (Figs. 12 and 14), is arranged between detail card feed rolls 58 and 150 and is fixed on a transverse cross shaft 271 journaled in the frame plates 152 and 153. Deflector 270 is arranged to occupy either of two positions, namely, a horizontal or closed position, as shown in Fig. 20, in which it serves to guide cards from rolls 57 and 66 from whence they are passed through rolls 150 and 154, etc., to "inter-file" pocket 140, or an inclined or open position in which it serves to deflect cards passed from rolls 57 and 66 into "receiver" pocket 27. Referring to Figs. 7 and 12, the left hand end of deflector shaft 271 extends beyond frame plate 152, and has secured thereto an arm 272 resiliently urged in a counter-clockwise direction by means of a spring 273 having one end connected to a pin mounted thereon and the other end connected to a pin 274 mounted upon frame plate 152. The arm 272 may be rocked in a clockwise direction against the tension of spring 273, to move deflector 270 to a closed position by means of an inclined cam surface 275 formed on the forwardly extending portion 276 of the depending arm 277 of bell-crank 251. Cam surface 275 is adapted to cooperate with a roller 278, mounted upon the arm 272, in such manner that, when the bell crank 251 is rocked counter-clockwise, as hereinbefore described, the cam surface 275 engages the roller 278 and rocks arm 272 clockwise to close deflector 270.

*Interfile pocket selector control mechanism*

In order to control selectively the passing of master cards, or detail cards, or master and detail cards concomitantly to either of the master card receiving pockets, or to either of the detail card receiving pockets, or to the "inter-file" pocket, the present invention provides means, manually settable to either of a plurality of positions, independently or in combination with the previously described selective sorting mechanism to cause the operation of either of the deflector mechanisms of the master and detail card receiving pockets, in accordance or discordance with the sensing of comparisons or non-comparisons between perforation patterns of designative data contained in master and detail cards.

For this purpose, the bell-crank 251 may be rocked in a clockwise or counter-clockwise direction to open or close respectively deflectors 235 and 270. The rack bar 254 is moved in a vertical direction by means of a knob 259 (Figs. 7, 19, and 20) rotatably mounted upon one end of a stub shaft 260, which shaft is suitably secured at its other end to the upright frame 152. The inner face of knob 259 has secured thereto a detent disc 261 which has secured upon its inner face a stub shaft 262. Rotatably mounted upon the stub shaft 262 is a gear 263 formed integral with another gear 264. Gear 263 is constantly in mesh with a larger gear 265 secured to shaft 260 and gear 264 is constantly in mesh with a larger gear 266 rotatably mounted upon shaft 260. Gear 266 is larger than gear 265, and is formed integral with another gear 267 having teeth in mesh with the teeth on a rack 268 suitably secured to rack bar 254. Detent disk 261 has formed on its periphery thereof a V-shaped notch 269 adapted to receive a roller 279 mounted upon a detent 280 urged in a counter-clockwise direction by a spring 289. Suitably mounted upon rack bar 254 is an indicator 281 movable with the rack bar in cooperation with an indicator plate 282 for denoting the different positions in which the rack may be set, namely, No. 1—"inoperative"; No. 2—"match"; No. 3—"all"; and No. 4—"non-match." The above construction is such that normally the rack bar is in its lowest position, with the indicator 281 in alignment with No. 1—"inoperative" indication on the plate 282. The rack bar 254 may be raised from its No. 1 position as shown in Fig. 7 to any other positions, i. e., No. 2, No. 3, and No. 4, by counter-clockwise rotation of knob 259. When the knob 259 is thus rotated, gear 263 mounted upon disk 261 revolves in a counter-clockwise direction around the periphery of the stationary gear 265, while it rotates in a counter-clockwise direction upon its own pivot 262. Gear 264 rotates in a counter-clockwise direction about its own pivot 262, but revolves in a counter-clockwise direction around the periphery of gear 266. Now, inasmuch as gear 266 is larger than gear 265, gear 266 is rotated in a counter-clockwise direction which through gear 267 raises rack bar 254. Rack bar 254 may be lowered from any one position by rotating knob 259 in a reverse or clockwise direction. When the knob 259 is thus rotated, gear 263 mounted upon disk 261 revolves in a clockwise direction around the periphery of the stationary gear 265, while it rotates in a clockwise direction upon its own pivot 262. Gear 264 rotates in a clockwise direction about its own pivot 262, but revolves in a clockwise direction around the periphery of gear 266. Now, inasmuch as gear 266 is larger than gear 265, gear 266 is rotated in a clockwise direction which through gear 267 lowers rack bar 254. The ratio of the above gears is such that one complete revolution of knob 259 is required to raise or lower the indicator 281 from one position to the next higher or lower position, as desired.

In order to lock the door 141 in closed position, shaft 214 is provided with an arm 283 (Figs. 10, 12, and 14) connected to the upright arm of a bell-crank 284 by a link 285. Bell-crank 284 is pivoted at 286 to the forward end of an adjustable bracket 287 mounted upon frame plate 153, and is provided with a hook portion 288 adapted to engage a stud 291 fixed to the frame casting of the machine. The construction is such that normally when the rack bar 254 is in its No. 1 position, the hook portion 288 is out of engagement with stud 291 and will not be moved into engagement until the rack is raised from its No. 1 position to any of its higher positions.

With the foregoing arrangement in mind, let it be assumed that it is not desired to pass any master or detail cards into "inter-file" pocket 140, and that master and detail cards are to be passed into their respective "receiver" or "eject" pockets in a manner above described. In this case, the inter-file mechanism may be disabled and the machine may be preconditioned by means of the sorting control lever 130, to perform either of three types of sorting operations, namely, 1. Segregating comparing detail cards from non-comparing detail cards and to convey all master cards to one receiving pocket;
2. To segregate comparing master cards from non-comparing master cards and to convey all detail cards to one receiving pocket;
3. Segregate comparing detail cards from non-comparing detail cards as well as to segregate comparing master cards from non-comparing master cards.

To obtain the above results, knob 259 is rotated clockwise or counter-clockwise, as the case may be, until the indicator 281 is in alignment with the No. 1 indication on plate 282. In this position, rack bar 254 is in its lowest position and bell-crank 251 is in its full clockwise position, whereby deflectors 235 and 270 are retained in open position due to the tension of their respective springs 238 and 273. It will be seen that, with deflector 235 and 270 thus retained in open position, the above first, second, and third types of sorting operations may be effected by setting the sorting control lever 130 at its L, U, and B positions, respectively, as above described. The distribution of cards for the above three functions is graphically illustrated in Fig. 25, (see operations 1B, 1A, and 1).

In the event it is desired to inter-file all the comparing master and detail cards with either non-comparing master cards, or non-comparing detail cards, or to inter-file all comparing master and detail cards and to segregate non-comparing master and detail cards, the present invention may be pre-set in combination with the sorting control lever 130, whereby the machine may be preconditioned to perform either of three types of sorting operations, namely, 1. Segregate non-comparing detail cards and to inter-file comparing master and detail cards and non-comparing master cards;
2. To segregate non-comparing master cards and to interfile comparing master and detail cards and non-comparing detail cards;
3. To segregate non-comparing master and detail cards and to inter-file comparing master and detail cards.

To effect the above three functions, knob 259 is rotated to bring indicator 281 in alignment with the No. 2 indication on plate 282 (see Fig. 20). With the rack bar 254 set in the above position, cam surface 275 cooperates with the roller 278 on arm 272 to retain its associated deflector 270 in a closed position. Also, the cam portion 244 on slide bar 241 cooperates with pin 245 on arm 237 in a manner to retain its associated deflector 235 in closed position. With the deflectors 235 and 270 thus retained in closed position, the first of the above three functions may be effected by setting sorting control lever 130 at its L position, in which pin 85 is in alignment with working face 121 on arm 120 associated with the detail card deflector 93. With the machine thus preconditioned, and assuming that master and detail cards are to be fed simultaneously, the passing of comparing and/or non-comparing master and detail cards to their respective receiving pockets is as follows:

As pin 85 is out of operating alignment with the working face 84 on arm 83, which is associated with the master card deflector 73, movement of the pin 85 upon non-comparisons, as heretofore described, will not effect the opening of deflector 73 and, since the other master card deflector 235 is retained in a closed position by slide 241, all comparing and/or non-comparing master cards will be passed, by means of the feed roll mechanism above described, into the "interfile" pocket 140. It will be recalled that upon comparisons, detail card deflector 93 remains closed to permit the comparing detail card to be fed past said deflector 93, and thereby be either deflected in the "receiver" pocket 27 or "interfile" pocket 140. However, as deflector 270 is at this time retained in a closed position, the comparing detail card will not be deflected into the "receiver" pocket 27, but will be fed into the "interfile" pocket 140, as heretofore described. Upon non-comparisons detail card deflector 93 is moved to open position by means heretofore described, to deflect non-comparing detail cards to "eject" pocket 28 (see operation 1E, Fig. 25).

In order to effect the second of the above three functions, sorting control lever 130 is set at its U position, in which pin 85 is in operating alignment with working face 84 on arm 83 which is associated with the master card deflector 73. With the machine thus preconditioned, and assuming that master and detail cards are to be fed simultaneously, the passing of comparing and/or non-comparing master and detail cards to their respective receiving pockets is as follows:

As pin 85 is out of operating alignment with the working face 121 on the arm 120 which is associated with the detail card deflector 93, movement of the pin 85 upon non-comparisons, as heretofore described, will not effect the opening of detail card deflector 93, and, since the other detail card deflector 270 is retained in a closed position by cam face 275 on bell crank 251, all comparing and/or non-comparing detail cards will be passed by means of the feed roll mechanism above described, into the "interfile" pocket 140. It will be recalled that upon comparisons, master card deflector 73 remains closed to permit the comparing master card to be fed past said deflector 73, and thereby be either deflected in the "receiver" pocket 25 or "inter-file" pocket 140. However, as deflector 235 is at this time retained in a closed position, the comparing master card will not be deflected into the "receiver" pocket 25, but will be fed into the "inter-file" pocket 140, as heretofore described. Upon non-comparisons, master card deflector 73 is moved to open position, and the non-comparing master card is deflected into the "eject" pocket 26 (see operation 1D, Fig. 25).

In order to effect the third of the above three functions, sorting control lever 130 is set at its B position in which pin 85 is in operating alignment with respective cam faces 84 and 121 on arms 83 and 120, associated with the master card deflector 73 and detail card deflector 93, respectively. With the machine thus preconditioned, and assuming that master and detail cards are fed simultaneously, the passing of comparing and/or non-comparing master and detail cards to their respective receiving pockets is as follows:

Upon comparisons, deflectors 73 and 93 are retained in closed position, as heretofore described, and the comparing master and detail cards are permitted to pass beyond deflectors 73 and 93 respectively. However, inasmuch as deflectors 235 and 270 are still retained in their closed position, the comparing master and detail cards will not be deflected into their "receiver" pockets 25 and 27, respectively, but will be passed to the "inter-file" pocket 140. It will be noted that the construction of the feed roll drive mechanism is such that each of the comparing master cards will be fed into the "inter-file" pocket ahead of its associated comparing detail card. Upon non-comparison, master and detail card deflectors 73 and 93 respectively, are opened as above described, to deflect non-comparing master and detail cards to their "eject" pockets 26 and 28, respectively (see operation 1C Fig. 25).

In the event it is desired to interfile all comparing and non-comparing master and detail cards without any segregation of any of such cards, the present invention may be preset whereby all the master and detail card deflectors are retained in closed position upon comparing and/or non-comparing operations of the machine. To effect the above function, knob 259 is rotated in a manner to raise or lower the rack bar 254, as the case may be, to a position wherein the indicator 281 thereon is in alignment with the No. 3 indication on plate 282 (see also Fig. 21). With the rack bar 254 in this position, the bell crank 251 retains the detail card deflector 270 in closed position, and the slide bar 241 retains the master card deflector 235 in closed position. In order to disengage the master card deflector 73 from under control of the comparing mechanism, as heretofore described, the forward end of slide bar 241 is provided with a roller 295 adapted, when the rack bar 254 is moved to the No. 3 position, to engage a cam face 296 formed on the upper part of link 80 and move said link forwardly, against the tension of a spring 297, to disengage the shoulder 78 on said link and pin 77 on arm 76. It will be noted that the upper end of link 80 is prevented from lateral displacement by a guide bracket 299 (see Fig. 6) secured to the left hand casting 50. With shoulder 78 and pin 77 thus disengaged, it will be seen that upward movement of the link 80 upon non-comparing operations of the machine will not cause opening of the master card gate 73 to deflect the card into the master card "eject" pocket 26.

In order to disengage the detail card deflector 93 from under control of the comparing mechanism, as heretofore described, the rack bar 254 is provided with a forward extension upon which is adjustably secured, by screws 298, a forked member 300, the tines of which encompass a roller 301 mounted upon the rearward end of link 112. Link 112 is guided for upward and downward movement by means of a shouldered screw 309 (Figs. 7, 12, and 21) thereon which passes through a slot 311 formed in an upright arm 312. Arm 312 is pivotally mounted upon a stud 313 fixed to frame plate 101. A spring 314 having one end connected to a pin 315 on link 112 and the other end connected to a pin 316 on frame plate 101 serves to urge link 112 downwardly. When rack bar 254 is raised to its No. 3 position, the link 112 is also raised, through the fork 300 and roller 301 against the tension of spring 314 to a position wherein the hook portion 108 of pawl 110 is out of engaging alignment with the roller 107 on latch plate 98 as shown in Fig. 21. It will be recalled that link 112 is moved forwardly upon non-comparing cycles of the machine, and if the hook portion 108 is in engaging alignment with the roller 107 of latch 98, as in the case when rack bar 254 is in either of its No. 1 or No. 2 positions, the latch plate 98 is tensioned in a counter-clockwise direction, so that at the proper time it will disengage bell crank 104 to cause opening of detail card deflector 73 to deflect the non-comparing detail cards in "eject" pocket 28. However, with the slide link in the above position, i. e., hook portion 108 out of operating alignment with roller 107, forward movement of slide link on non-comparisons will not effect tensioning of latch plate 98 and deflector 73 will be retained in closed position. It will be seen, therefore, that when both of the master card deflectors 73 and 235 are retained in closed position as above described, the master card is fed, by the feed roll mechanism to the "interfile" pocket 140, whether or not it compares with a corresponding detail card. Also, when both of the detail card deflectors 93 and 270 are retained in closed position as above described, the detail card is fed by the feed roll mechanism, to the "inter-file" pocket 140 whether or not it compares with its corresponding master card (see operations 1F, 1G and 1H, Fig. 25).

In the event it is desired to segregate comparing master and/or detail records, and to inter-file non-comparing master and detail records, the present invention may be pre-set in combination with the sorting control lever 130 whereby the machine may be preconditioned to perform either of three types of sorting operations, namely, 1. To convey all comparing and non-comparing master cards to a master card receiving pocket and all comparing detail cards to a detail card receiving pocket and to convey non-comparing detail cards to the "inter-file" pocket;
2. To convey all comparing and non-comparing detail cards to a detail card receiving pocket and all comparing master cards to a master card receiving pocket and to convey non-comparing master cards to the "inter-file" pocket;
3. To segregate all comparing master and detail cards and to inter-file all non-comparing master and detail cards.

To effect the above three functions, knob 259 is rotated in a manner to bring indicator 281 in alignment with the No. 4 indication on plate 282 (see Fig. 22) to raise link 112 against the tension of spring 314 to a position wherein hook portion 108 is out of operative alignment with roller 107. With the rack bar 254 in this position, the bell crank 251 and slide bar 241 are in their full forward position, and deflectors 235 and 270 are retained in their closed position. When the slide bar 241 is thus moved to its full forward position, roller 295 thereon engages cam face 296 on link 80 and moves said link 80 forwardly still further from its No. 3 position. During this forward movement of link 80, a cam surface 302, formed upon a rearwardly extending arm 303 thereof, engages a stud 304' on bell crank 76 and rocks said bell-crank in a counter-clockwise direction, against the tension of spring 75, to open master card deflector 73 and retain said deflector in open position during comparing operations of the machine. In order to open detail card deflector 93 upon comparisons, link 112 is provided with cam slide 304 mounted for sliding movement on studs 305 secured to the link 112. Cam slide 304 is resiliently urged toward the rear of the machine by a spring 306, stronger than spring 99 and having one end connected to one of said studs 305 and the other end connected to a pin 307 on slide 304. The slide 304 is provided at its rearward end with a cam face 308 which, when the link 112 is raised as above described, engages a roller 310 mounted upon the upper portion of latch plate 98 in a manner to move said slide 304 forwardly against the tension of spring 306. It will be seen that when the link 112 is thus set at its No. 4 position, latch plate 98 is tensioned counter-clockwise by slide 304, but is prevented from counter-clockwise movement by latch 104. However, it will be recalled that toward the end of each machine cycle, roller 125 on bell-crank 122 rides upon the shallow dwell of cam 126 which, through link 96, bell crank 95, and another link 106 serves to rock bell-crank 104 clockwise to disengage hook 103 from notched shoulder 102 and permits latch plate 98 to rock counter-clockwise. Toward the end of the same cycle, roller 125 rides upon the high dwell of cam 126 and, inasmuch as at this time notched shoulder 102 is not in the path of movement of hook portion 103 of bell crank 104, spring 97 serves to rock bell crank 95 and deflector 93 counter-clockwise to open deflector 93. It will be seen, therefore, that as long as perforation patterns in corresponding master and detail cards are identical, latch plate 98 is resiliently retained in its counter-clockwise position, permitting deflector 93 to be opened at the proper time in the cycle to deflect comparing detail cards into "eject" pocket 28. During non-comparing operations slide 304 is moved forwardly as above described, thereby disengaging cam face 308 from roller 310, enabling spring 99 to retain latch plate 98 in latched position and prevent the opening of deflector 93.

With the foregoing arrangement in mind, in order to effect the first of the above three functions, the control lever 130 is preset at its L position, in which pin 85 is in alignment with cam face 121 on arm 120 associated with detail card deflector 93. With the machine thus pre-conditioned and assuming that master and detail cards are to be fed simultaneously, comparing detail cards are deflected to "eject" pocket 28 due to the fact that deflector 93 is opened at the proper time through the disabling of latch plate 98 by cam slide 304, as above described. However, since link 112 is moved forward upon non-comparison, latch plate 98 is retained in effective latching position to retain deflector 93 in closed position, thereby permitting non-comparing detail cards to be fed by the above described feed roll mechanism, into the "inter-file" pocket 140. It will be recalled that with the rack bar 254 in its No. 4 position, cam face 302, cooperating with pin 304' on bell crank 76, retains the master card deflector 73 in open position. However, inasmuch as pin 85 is not at this time in operative alignment with working face 84 on arm 83, link 80 will not be raised upon a non-comparison and, therefore, all master cards whether or not they compare with corresponding detail cards will be deflected into "eject" pocket 26 (see operation 1K, Fig. 25).

To effect the second of the above three functions, sorting control lever 130 is set at its U position in which pin 85 is in operating alignment with cam face 84 on arm 83 associated with the master car deflector 73. With the machine thus preconditioned, and assuming that master and detail cards are to be fed simultaneously, comparing master cards are passed to "eject" pocket 26, due to the fact that deflector 73 is retained in open position during comparing operations of the machine, as above described. However, upon non-comparison, pin 85 elevates link 80 causing cam face 302 to disengage from stud 304' to permit bell crank 76 to be rocked in a clockwise direction by spring 75. This causes closing of deflector 73 thus permitting non-comparing master cards to be passed beyond the closed deflectors 73 and 235 and thence to the "inter-file" pocket 140. Due to the fact that pin 85 is not in operating alignment with working face 121 on arm 120, deflector 93 is effective to deflect comparing and non-comparing detail cards into "eject" pocket 28. (See Fig. 25, operation 1J.)

In order to effect the third of the above three functions, sorting control lever 130 is set at its B position in which pin 85 is in operative alignment with respective working faces 84 and 121 on arms 83 and 120 associated with the master card deflector 73 and detail card deflector 93, respectively. With the machine thus preconditioned, and assuming that master and detail cards are to be fed simultaneously, the passing of comparing and/or non-comparing master and detail cards to their respective receiving pockets is as follows:

It will be recalled that upon comparisons master card deflector 73 is retained in open position by means of cam face 302 engaging stud 304', and detail card deflector 93 is permitted to open by the disabling of latch plate 98 by cam slide 304. Therefore, all comparing master and detail cards will be deflected to their respective "eject" pockets 26 and 28. However, upon non-comparisons link 80 is raised, as above described, to permit master card deflector 73 to close, and link 112 is moved forwardly to disable cam slide 304, permitting latch 98 to retain detail card deflector 93 in closed position. Therefore, in this case, non-comparing master and detail cards are permitted to be fed to "inter-file" pocket 140 (see operation 1I, Fig. 25).

Thus, when cam 780 is rendered effective, the card sorting control knob 259 and lever 130 may be set in combination, in accordance with the requirements of a given card handling problem, to cause the sorting or inter-filing of master cards only, or of detail cards only, or of master cards and detail cards concomitantly.

*Control device operation selector mechanism*

In order to render sorting control cam 780 effective, means corresponding to those disclosed in the cited Patent 2,211,094 are provided to select this cam for operation. For this purpose, a cam lug 787 (Figs. 5 and 20) may be placed in any desired position on a disc 788 which is secured to sleeve 702 of the operation selector mechanism. Then, when operation selector control dial 700 is rotated to a position to place a lug 787 in register with a roller 786, carried on the right end of lever 90, lever 90 is rocked clockwise to elevate pivot 88 whereby roller 92 is moved into operative relationship with cam 780 to render the cam effective for controlling card sorting operations.

*Combinational card handling operations*

The manner in which sorting control cam 780 in either of its settings, may be selected for operation in conjunction with other control cams to obtain different types of card handling operations, is completely disclosed in the above cited Patent 2,211,094, and a list of the various combinational operations that may be effected by these cams is graphically illustrated in Fig. 74 thereof. As therein described, a punch control cam 770 and/or stopping control cam 760 may be selected for operation with sorting control cam 780 which cams when employed in conjunction with the mechanism of the present invention increase the number of combinational operations that may be obtained. A partial list of these operations is graphically illustrated in Fig. 24, which includes one of the operations that employ sorting control cam 780, as set forth in Fig. 74 of the cited Patent 2,211,094, the two additional operations as set forth in Patent 2,229,983, and the seven additional operations that may be obtained in each case when sorting control knob 259 is set in either of the No. 2, No. 3, or No. 4 positions in combination with the setting of the lever 130 in either of its B, U, or L positions.

For example, operation No. 1 of Fig. 24 illustrates the type of operation obtained when cam 780 alone is selected for operation, lever 130 is set at its B position, and knob 259 is set at its No. 1 position. This operation, in which both master and detail card deflectors 73 and 93, respectively, are operated in accordance with the action of the comparing mechanism to segregate master and detail cards, corresponds to operation No. 1 of the cited Patent 2,211,094. Operations No. 1A and No. 1B illustrate the types of operation obtained when cam 780 alone is selected for operation, lever 130 is set at its U and L positions, respectively. In both operations No. 1A and No. 1B, knob 259 is set at its No. 1 position. Operations No. 1A and No. 1B as shown in the present chart (Fig. 24), correspond to operations No. 1A and No. 1B disclosed in cited Patent 2,229,983. In operation No. 1A only the master card deflector mechanism is operated in accordance with the action of the comparing mechanism to segregate comparing master cards from the non-comparing master cards, whereas in operation No. 1B only the detail card deflector mechanism is operated to segregate the comparing detail cards from the non-comparing detail cards. Operations No. 1C, No. 1D and No. 1E illustrate the types of operation obtained when cam 780 alone is selected for operation selector control knob 259 is set at its No. 2 position, and lever 130 is set at its B, U, and L positions, respectively. In operation No. 1C, the master and detail card deflector mechanisms are operated in accordance with the action of the comparing mechanism to interfile all comparing master and detail cards, and to pass non-comparing master and detail cards to their respective "eject" pockets 26 and 28. In operation No. 1D, master and detail card deflector mechanisms are operated to inter-file comparing and non-comparing detail cards and comparing master cards, and to pass non-comparing master cards to their "eject" pocket 26. In operation No. 1E, the master and detail card deflector mechanisms are operated to inter-file comparing and non-comparing master cards and comparing detail cards, and to pass non-comparing detail cards to their "eject" pocket 28.

Operations 1F, 1G and 1H illustrate the types of operation obtained when cam 780 alone is selected for operations, selector control knob 259 is set at its No. 3 position, and lever 130 is set at its B, U, and L positions, respectively. In all of the above three settings, all master and detail card deflectors are rendered ineffective (closed), and all comparing and non-comparing master and detail cards are passed to inter-file pocket 140.

Operations No. 1I, No. 1J, and No. 1K illustrate the types of operation obtained when cam 780 is selected for operation, selector control knob 259 is set at its No. 4 position, and lever 130 is set at its B, U, and L positions, respectively. In operation No. 1I, the master and detail card deflector mechanisms are operated in accordance with action of the comparing mechanism to interfile all non-comparing master and detail cards, and to pass comparing master and detail cards to their respective "eject" pockets 26 and 28. In operations No. 1J, master and detail card deflector mechanisms are operated to interfile all non-comparing master cards and to pass comparing and non-comparing detail cards and comparing master cards to their respective "eject" pockets 26 and 28. In operation No. 1K, master and detail card deflector mechanisms are operated to interfile all non-comparing detail cards and to pass comparing and non-comparing master cards and comparing detail cards into their respective "eject" pockets 26 and 28.

In view of the foregoing, it is apparent that for each operation listed in Fig. 74 of Patent 2,211,094 and in Figs. 8 and 8A of Patent 2,229,983 wherein control cam 780 is employed either singly or in combination with other control cams, the number of varying types of card handling operations made possible by the instant disclosure may be similarly increased. As in the cited patents, the reference characters designating the operation control cam has been enclosed in brackets to indicate that the control cam, in that type of operation, is offset 45° relative to sleeve 600 of the control device fully described in Patent 2,211,094. It will be noted that in the present case, it is not deemed necessary to offset cam 780 relative to sleeve 600, due to the fact that the present invention provides for the converse action of the master and detail card deflectors. However, in the present machine cam 780 may be offset 45° relative to sleeve 600 during the time that knob 259 is set at its No. 1 ineffective position, in which case sorting selection is made solely by the bell crank 130.

Each of the operations illustrated in Fig. 24, as in the case of the operations illustrated in Fig. 74 of the cited Patent 2,211,094, may be effected in conjunction with any one of the card feeding control cams or discs described in the cited patent in accordance with the quantitative relationship of master and detail cards in a given card handling problem.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new and desire to secure by Letters Patent is:

1. In a machine for handling master and detail records, and including a comparing means for sensing comparisons or non-comparisons between statistical data on such records, the combination of separate receiving pockets, separate record conveying means for passing master and detail records to said respective receiving pockets, deflecting means associated with each of said conveying means, each of said deflecting means being arranged when operated to prevent passage of records to their respective receiving pockets, means operable under control of the comparing means to operate both of said deflecting means, a common pocket, additional deflecting means arranged when effective to prevent the passing of records to said common pocket, and means for dissociating either or both of said first mentioned deflecting means from the control of the comparing means selectively and for rendering said second mentioned deflecting means ineffective.

2. In a machine for handling master and detail records, and including a comparing means for sensing comparisons or non-comparisons between statistical data on such records, the combination of separate receiving pockets, separate record conveying means for passing master and detail records to said respective receiving pockets, deflecting means associated with each of said conveying means, each of said deflecting means being arranged when operated to prevent passing of records to said pockets, means operable under control of the comparing means to operate both of said deflecting means, a common pocket, additional deflecting means arranged when effective to prevent the passing of records to said common pocket, and means for rendering said second mentioned deflecting means ineffective.

3. In a machine for handling master and detail records, and including a comparing means for sensing comparisons or non-comparisons between statistical data on such records, the combination of separate receiving pockets, separate record conveying means for passing master and detail records to said respective receiving pockets, deflecting means associated with each of said conveying means, each of said deflecting means being arranged when operated to prevent passing of records to said pockets, means operable under control of the comparing means to operate both of said deflecting means when a non-comparison is sensed, a common pocket, additional deflecting means arranged when effective to prevent the passing of records to said common pocket, and means for rendering said second mentioned deflecting means ineffective.

4. In a machine for handling master and detail records, and including a comparing means for sensing comparisons or non-comparisons between statistical data on such records, the combination of separate receiving pockets, separate record conveying means for passing master and detail records to said respective receiving pockets, deflecting means associated with each of said conveying means, each of said deflecting means being arranged when operated to prevent passing of records to said pockets, means operable under control of the comparing means to operate both of said deflecting means when a comparison is sensed, a common pocket, additional deflecting means arranged when effective to prevent the passing of records to said common pocket, and means for rendering said second mentioned deflecting means ineffective.

5. In a machine for handling master and detail records, and including a comparing means for sensing comparisons or non-comparisons between statistical data on such records, the combination of separate receiving pockets, separate record conveying means for passing master and detail records to said respective receiving pockets, deflecting means associated with each of said conveying means, each of said deflecting means being arranged when effective to prevent passing of records to said pockets, means operable under control of the comparing means to render both of said deflecting means effective, a common pocket, additional deflecting means arranged when effective to prevent the passing of records to said common pocket, and means for rendering all of said deflecting means ineffective.

6. In a machine for handling master and detail records, and including a comparing means for sensing comparisons or non-comparisons between statistical data on such records, the combination of separate receiving pockets, separate record conveying means for passing master and detail records to said respective receiving pockets, deflecting means associated with each of said conveying means, each of said deflecting means being arranged when effective to prevent passing of records to said pockets, means operable under control of the comparing means to render both of said deflecting means effective, a common pocket, additional deflecting means arranged when effective to prevent the passing of records to said common pocket, and means for rendering said second mentioned deflecting means ineffective, to permit passing of all comparing and non-comparing master and detail records to said common pocket.

7. In a machine for handing master and detail records, and including a comparing means for sensing comparisons or non-comparisons between statistical data on such records, the combination of separate receiving pockets, separate record conveying means for passing master and detail records to said respective receiving pockets, deflecting means associated with each of said conveying means, each of said deflecting means being arranged when operated to prevent passing of records to said pockets, means operable under control of the comparing means to operate both of said deflecting means when a non-comparison is sensed, a common pocket, additional deflecting means arranged when effective to prevent the passing of records to said common pocket, and means for dissociating one of said first mentioned deflecting means from the control of the comparing means and for rendering said second mentioned deflecting means ineffective, to permit passing of all comparing master and detail and non-comparing detail records to said common pocket.

8. In a machine for handling master and detail records, and including a comparing means for sensing comparisons or non-comparisons between statistical data on such records, the combination of separate receiving pockets, separate record conveying means for passing master and detail records to said respective receiving pockets, deflecting means associated with each of said conveying means, each of said deflecting means being arranged when operated to prevent passing of records to said pockets, means operable under control of the comparing means to operate both of said deflecting means when a comparison is sensed, a common pocket, additional deflecting means arranged when effective to prevent the passing of records to said common pocket, means for dissociating one of said first mentioned deflecting means from the control of the comparing means, and means for rendering said second mentioned deflecting means ineffective and for operating said dissociated deflecting means to permit passing of non-comparing master records only to said common pocket.

9. In a machine for handling master and detail records, and including a comparing means for sensing comparisons or non-comparisons between statistical data on such records, the combination of separate receiving pockets, separate record conveying means for passing master and detail records to said respective receiving pockets, deflecting means associated with each of said conveying means, each of said deflecting means being arranged when operated to prevent passing of records to said pockets, means operable under control of the comparing means to operate both of said deflecting means when a comparison is sensed, a common pocket, additional deflecting means arranged when effective to prevent the passing of records to said common pocket, means for dissociating one of said first mentioned deflecting means from the control of the comparing means, and means for rendering said second mentioned deflecting means ineffective and for operating said dissociated deflecting means to permit passing of non-comparing detail records only to said common pocket.

10. In a machine for handling master and detail records, and including a comparing means for sensing comparisons or non-comparisons between statistical data on such records, the combination of separate receiving pockets, separate record conveying means for passing master and detail records to said respective receiving pockets, deflecting means associated with each of said conveying means, each of said deflecting means being arranged when operated to prevent passing of records to said pockets, means operable under control of the comparing means to operate both of said deflecting means when a comparison is sensed, a common pocket, additional deflecting means arranged when effective to prevent the passing of records to said common pocket, and means for dissociating one of said first mentioned deflecting means from the control of the comparing means and for rendering said second mentioned deflecting means ineffective, to permit passing of all non-comparing master and detail and comparing detail records to said common pocket.

11. In a machine for handling individual groups of records including record comparing means, and separate concurrently operable record conveying means for each of said groups of records, a plurality of record receiving pockets individual to each of said conveying means, deflector mechanisms associated with each of said conveying means and effective for deflecting a record into a related pocket, a receiving pocket common to both said conveyor means, and disposed to receive records undeflected by said deflector mechanisms, an operating member individual to a deflector mechanism associated with each conveying means, said operating members being controlled by said comparing means for operating one of the deflector mechanisms associated with each of the conveying means, and pocket selector control means including a settable member operable for selectively enabling said members controlled by said comparing means and for disabling another one of said deflector mechanisms associated with each of said conveying means.

12. In a machine for handling individual groups of records including record comparing means, and separate concurrently operable record conveying means for each of said groups of records, a plurality of record receiving pockets individual to each of said conveying means, deflector mechanisms associated with each of said conveying means and effective for deflecting a record into a related pocket, a receiving pocket common to both said conveyor means and disposed to receive records undeflected by said deflector mechanisms, an operating member individual to a deflector mechanism associated with each conveying means, said operating members being controlled by said comparing means for operating one of the deflector mechanisms associated with each of the conveying means, means for disassociating one or another of said operating members from control of said comparing means, and pocket selector control means including a settable member operable for selectively enabling the operating member under control of said comparing means and for disabling another deflector mechanism associated with each conveying means.

13. In a machine for handling individual groups of records and including means for comparing records of one group with records of another group, a common record receiving pocket, separate feeding means for each group of records concurrently operable under all comparing conditions for conveying comparing or non-comparing records to said common receiving pocket, successively disposed deflector mechanisms for each of said feeding means, each arranged when effective to prevent passing of a record to said common pocket, a pocket individual to each deflector mechanism for receiving records deflected by the associated deflector mechanism, settable means for operating one of said deflector mechanisms associated with each feeding means, and separate deflector actuating means under control of said comparing means and said settable means for operating another deflector mechanism associated with each feeding means.

14. In a machine for handling individual groups of records and including means for comparing records of one group with records of another group, a common record receiving pocket, separate feeding means for each group of records concurrently operable under all comparing conditions for conveying comparing or non-comparing records to said common receiving pocket, successively disposed deflector mechanisms for each of said feeding means, each arranged when effective to prevent passing of a record to said common pocket, a pocket individual to each deflector mechanism for receiving records deflected by the associated deflector mechanism, settable means for operating one of said deflector mechanisms associated with each feeding means, separate deflector actuating means under control of said comparing means and said settable means for operating another deflector mechanism associated with each feeding means, and means for disassociating one or another of said deflector actuating means from control of said comparing means selectively.

15. In a machine for handling individual groups of records including record comparing means, and separate concurrently operable record conveying means for each of said groups or records, a plurality of record receiving pockets individual to each of said conveying means, deflector mechanisms associated with each of said conveying means and effective for deflecting a record into a related pocket, a receiving pocket common to both said conveyor means and disposed to receive records undeflected by said deflector mechanisms, a separate operating means individual to a deflector mechanism associated with each conveying means, each of said separate operating means being controlled by said comparing means and including a reversely actuable pivotal member connectable at opposite sides of the pivotal axis thereof with the associated operating means, and pocket selector control means for operating another deflector mechanism associated with each conveying means and having a plurality of settable positions, said control means including separate settable members engaging each of said separate operating means for selectively effecting one or another of said connections with said pivotal members whereby in one setting of said members the associated deflector mechanisms are operated under control of the comparing means from an ineffective to effective deflecting position and in another setting said deflector mechanisms are operated under control of the comparing means from an effective to ineffective deflecting position.

16. In a machine for handling individual groups of records including record comparing means, and separate concurrently operable record conveying means for each of said groups of records, a plurality of record receiving pockets individual to each of said conveying means, deflector mechanisms associated with each of said conveying means and effective for deflecting a record into a related pocket, a receiving pocket common to both said conveyor means and disposed to receive records undeflected by said deflector mechanisms, a separate operating means individual to a deflector mechanism associated with each conveying means, each of said separate operating means being controlled by said comparing means and including a reversely actuable pivotal member connectable at opposite sides of the pivotal axis thereof with the associated operating means, means for dissociating one or another of said separate operating means from control of said comparing means, and pocket selector control means for operating another deflector mechanism associated with each conveying means and having a plurality of settable positions, said control means including separate settable members engaging each of said separate operating means for selectively effecting one or another of said connections with said pivotal members whereby in one setting of said members the associated deflector mechanisms are operated under control of the comparing means from an ineffective to effective deflecting position and in another setting said deflector mechanisms are operated under control of the comparing means from an effective to ineffective deflecting position.

JOHN T. FERRY.

REFERENCES CITED

The following references are of record in the file of this patent:

UNITED STATES PATENTS

| Number | Name | Date |
| --- | --- | --- |
| 1,862,032 | Peirce | June 7, 1932 |
| 2,379,828 | Rubidge et al. | July 3, 1945 |